(12) United States Patent
Scott et al.

(10) Patent No.: US 11,753,039 B2
(45) Date of Patent: Sep. 12, 2023

(54) COLLABORATIVE AUTONOMOUS GROUND VEHICLE

(71) Applicant: AUGEAN ROBOTICS, INC., Philadelphia, PA (US)

(72) Inventors: Terry Scott, Philadelphia, PA (US); Berkay Ilhan, Egg Harbor City, NJ (US); Vibhor Sood, Philadelphia, PA (US); Charles Andersen, Phoenixville, PA (US)

(73) Assignee: Augean Robotics, Inc., Philadelphia, PA (US)

( * ) Notice: Subject to any disclaimer, the term of this patent is extended or adjusted under 35 U.S.C. 154(b) by 292 days.

(21) Appl. No.: 17/311,462

(22) PCT Filed: Dec. 19, 2019

(86) PCT No.: PCT/US2019/067458
§ 371 (c)(1),
(2) Date: Jun. 7, 2021

(87) PCT Pub. No.: WO2020/132233
PCT Pub. Date: Jun. 25, 2020

(65) Prior Publication Data
US 2022/0024486 A1 Jan. 27, 2022

Related U.S. Application Data

(60) Provisional application No. 62/782,691, filed on Dec. 20, 2018.

(51) Int. Cl.
*B60W 60/00* (2020.01)
*B60K 37/06* (2006.01)

(52) U.S. Cl.
CPC ......... *B60W 60/0025* (2020.02); *B60K 37/06* (2013.01); *B60W 2300/40* (2013.01); *B60W 2420/42* (2013.01); *B60W 2556/60* (2020.02)

(58) Field of Classification Search
CPC ......... B60W 60/0025; B60W 2300/40; B60W 2420/42; B60W 2556/60; B60K 37/06;
(Continued)

(56) References Cited

U.S. PATENT DOCUMENTS

| 11,605,244 B2 * | 3/2023 | Lee .......................... G06T 7/194 |
| 2011/0026770 A1 | 2/2011 | Brookshire |

(Continued)

FOREIGN PATENT DOCUMENTS

| FR | 3048406 A1 | 9/2017 |
| JP | 2014-071631 A | 4/2014 |

(Continued)

OTHER PUBLICATIONS

English Translation for JP 2015-079368A.
(Continued)

*Primary Examiner* — Richard M Camby
(74) *Attorney, Agent, or Firm* — Caesar Rivise, PC

(57) ABSTRACT

A collaborative autonomous ground vehicle or robot for traversing a ground surface is disclosed. The robot is a wheeled vehicle includes two camera groups and other sensors to sense the environment in which the robot will operate. The robot includes a control system configured to operate in a teach mode to learn a route by either following a person or preceding a person and to store the learned route as a taught route. The control system is configured for identifying persons and objects, such as obstacles, within the fields of view of the camera groups. When the robot is in its repeat mode it will take the taught route over the ground surface and take appropriate action if an obstacle is identified in the field of view.

26 Claims, 13 Drawing Sheets

(58) Field of Classification Search
CPC ... G05D 2201/0201; G05D 2201/0216; G05D 1/0251; G05D 1/0274; G05D 1/0221; G06N 5/01; G06N 7/01; G06N 3/08
See application file for complete search history.

(56) References Cited

U.S. PATENT DOCUMENTS

2014/0249676 A1* 9/2014 Florencio ............... G06N 3/008
 700/258
2017/0332872 A1* 11/2017 Jun ......................... G06T 7/521

FOREIGN PATENT DOCUMENTS

| JP | 2015-079368 A | 4/2015 |
|----|---------------|--------|
| KR | 10-2017-0025334 A | 3/2017 |
| KR | 10-2018-0134604 A | 12/2018 |

OTHER PUBLICATIONS

English Translation for KR 10-2017-0025334A.
English Translation for KR 10-2018-0134604A.
English Translation for JP 2014-071631A.
International Search Report for PCT/US2019/067458 dated Apr. 28, 2020.
Victor Alvarez-Santos et al: "Route Learning and Reproduction in a Tour-Guide Robot", Jun. 10, 2013, Natural and Artificial Computation in Engineering and Medical Applications, Springer Berlin Heidelberg, Berlin, Heidelberg, pp. 112-121, XP047030772, ISBN: 978-3-642-38621-3.
Machine Translation of FR 3048406 A1 (Sep. 8, 2017).
Extended European Search Report for 19901045.5 dated Jul. 8, 2022.

* cited by examiner

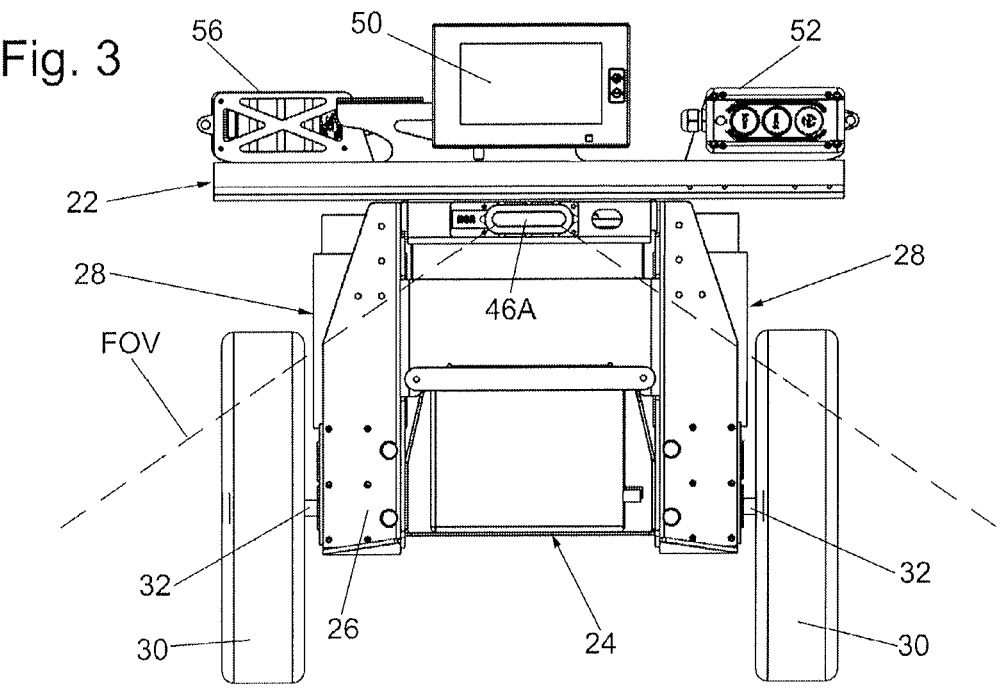
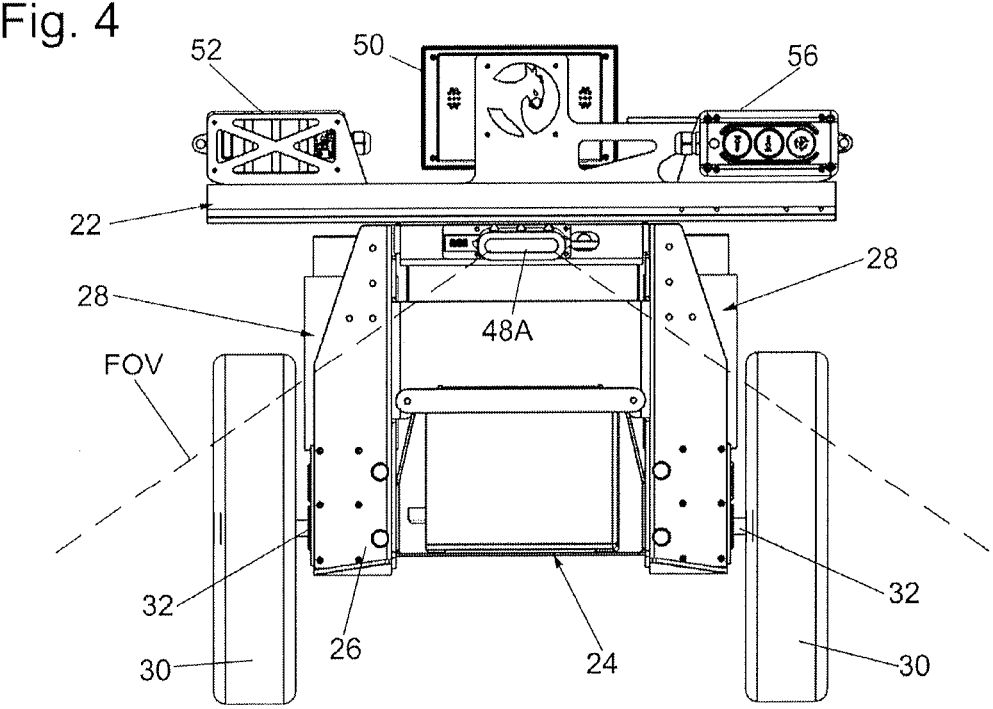

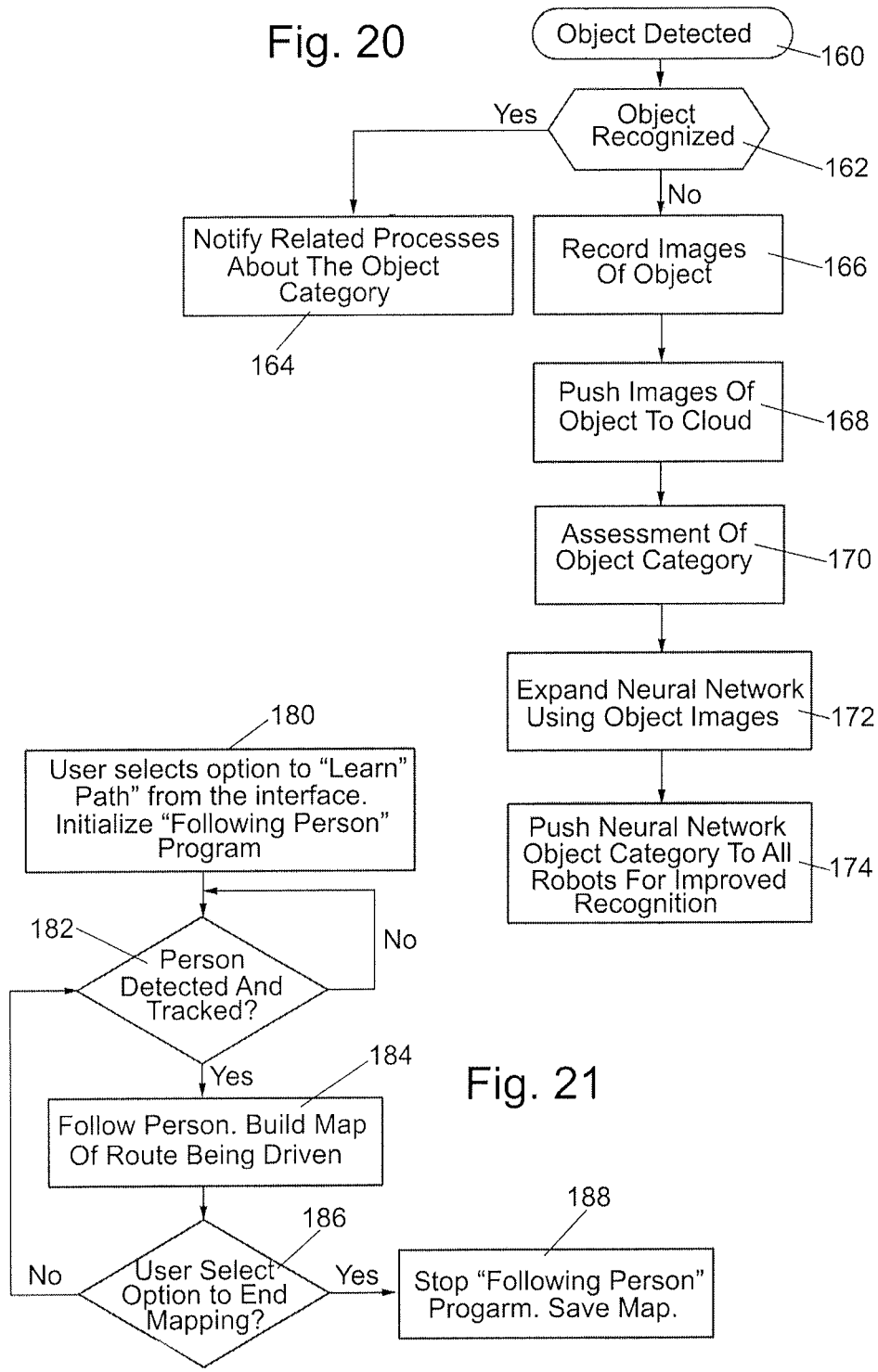

COLLABORATIVE AUTONOMOUS GROUND VEHICLE

CROSS-REFERENCE TO RELATED APPLICATIONS

This PCT application claims the benefit under 35 U.S.C. § 119(e) of Provisional Application Ser. No. 62/782,691 filed on Dec. 20, 2018, entitled COLLABORATIVE AUTONOMOUS MOBILE UTILITY ROBOT. The entire disclosure of the provisional application is incorporated by reference herein.

FIELD OF THE INVENTION

This invention relates generally to robotics and more particularly to a collaborative autonomous ground vehicle that can be used in fields or in indoor applications to traverse paths which it has learned.

SPECIFICATION

Background of the Invention

Since the mid-twentieth century robots and other machinery employed in industrial processes have increased the efficiency of those processes through automation of repeatable tasks formerly performed by humans alone. The earliest automated processes, such as conveying of objects from one location to another, were followed by the automation of welding, cutting, gripping tasks, and numerous other mechanical tasks, frequently performed by robotic machines in the form of arm-like structures. Through the introduction of sensors and integrated software, mechanical systems became capable of utilizing feedback, such as through touch, light detection, and pressure to further broaden their application.

Through further advancement in robotics, mobility was incorporated into industrial robotic automation processes. Such mobile robots are most commonly utilized in indoor environments. In such controlled environments, robotic vehicles are typically installed and then controlled by central computers that send them to specific locations, such as shelves where the robots retrieve inventory, which the robot may then, under control of the central computer, bring back to a specific point. Today, autonomous, robotic vehicles are widely used in warehouses, distribution centers, and other controlled environments to transport materials and perform other tasks. Controls in these environments may include visual row delineations, such as tape guides, beacons for communication with machines in close proximity, and electronic fencing technologies. These indoor environments are conducive to the utilization of such controls, which may be permanently installed, including on overhead structures such as beams, and are unlikely to be subjected to hazards of physical damage or exposure to changing climate conditions, such as would be inherent to outdoor environments.

In outdoor settings, fully autonomous vehicles are less prevalent. Although semi-autonomous vehicles such as tractors are used to perform tasks like seeding, tillage, and harvesting, they must rely on sophisticated, high-precision global positioning systems to effect autonomous movement. Moreover, such machinery is unsuited to use in a collaborative way with human workers due to the size of the machinery and likelihood of serious injury to the workers. The ability of autonomous or semi-autonomous machinery to safely operate in close proximity to humans is particular important in agricultural environments that rely on pickers, such as fruit fields, farms, and orchards.

The field of collaborative robotics has advanced the ability of autonomous machines to work with humans to some extent by the inclusion of basic safety features, such as stopping machine movement in response to proximate people or objects detected by touch or basic visual indicia. These advances have not, however, extended to complex, autonomous use in unstructured environments, particularly outdoor environments, lacking fixed guidance and communication structures. Nor have they included capabilities of the machines to process novel environmental sensory observations and adapt their autonomous repetition of learned or programmed tasks based on intelligent interpretation of those environmental observations to do so accurately, efficiently, and safely in collaboration with humans.

Particularly, with respect to such exterior environments, prior systems have not successfully transferred capabilities of indoor traversal, where travel surfaces are assumed to be flat, to exterior environments where inherently uneven surfaces must be recognized and evaluated, and may still prove to be traversable.

Thus, a need exists for an autonomous, mobile ground vehicle for intelligent and adaptive collaborative operation with humans in unstructured environments. The subject invention addresses that need.

BRIEF SUMMARY OF THE INVENTION

One aspect of this invention constitutes an autonomous ground vehicle for traversing a ground surface in an environment. The autonomous ground vehicle comprises a body, a drive assembly and a control system. The body comprises a payload bed, a front end portion and a rear end portion, and at least one of a front camera group and a rear camera group. The front camera group comprises at least one camera having a front field of view in front of the front end portion. The front camera group provides a front camera image of the front field of view. The rear camera group comprises at least one camera having a rear field of view behind the rear end portion. The rear camera group provides a rear camera image of the rear field of view. The drive assembly includes plural wheels to enable the autonomous ground vehicle to move over the ground surface. The control system is configured to operate in a teach mode and a repeat mode and comprises a microprocessor configured to be instructed by a digital instruction set. The control system is coupled to the at least one of the front camera group and the rear camera group and to the drive assembly for controlling the movement of the autonomous ground vehicle over the ground surface in at least one of a follow person route and a precede person route. The follow person route is established by the autonomous ground vehicle automatically following a person walking in front of the front end portion and within the front field of view. The precede person route is established by the autonomous ground vehicle automatically preceding a person walking behind the rear end portion and within the rear field of view. The control system is configured for identifying at least one person and the position of the at least one person relative to the front end portion or to the rear end portion, for detecting a region of the front camera image that contains at least one person or for detecting a region of the rear camera image that contains at least one person, for estimating the distance of the at least one person from the front or rear camera group providing the front or rear camera image. When the control system is in the teach mode the control system remembers the follow person route or the precede person route as a taught route. When the control system is in the repeat mode the control system causes the autonomous ground vehicle to autonomously take the taught route over the ground surface and may be capable of doing so either in the direction taught or in the reverse direction. Embodiments of the autonomous ground vehicle may also receive a taught route programmatically or through communication components, such as may permit known routes, such as those taught to other robots or manually generated, to be supplied to the robot for use in a given environment.

In accordance with one preferred aspect of this invention, the control system is configured for identifying as a follow candidate a person within the front field of view for the autonomous ground vehicle to follow in the follow person route. The control system is also configured to identify the follow candidate from multiple persons who may be within the front field of view. The control system is also configured for identifying as a precede candidate a person within the rear field of view for the autonomous ground vehicle to precede in the precede person route. The control system is also configured to identify the precede candidate from multiple persons who may be within the rear field of view.

In accordance with another preferred aspect of this invention, the control system is configured for identifying the follow candidate or the precede candidate when the autonomous ground vehicle is stationary, wherein the follow candidate is selected in accordance with the following criteria. Only persons within a predetermined radius from the front camera group within the front field of view are considered as candidates, others will be ignored. A candidate will only be selected if the candidate is moving at a speed above a predetermined threshold. If only one such candidate exists that candidate will be selected. If multiple candidates exists, a candidate will be selected if he/she is closest to the front camera group and within a corridor having preset lateral boundaries within the front field of view, and wherein the precede candidate is selected in accordance with the following criteria. Only persons within a predetermined radius from the rear camera group within the rear field of view are considered as candidates, others will be ignored. A candidate will only be selected if the candidate is moving at a speed above a predetermined threshold. If only one such candidate exists that candidate will be selected. If multiple candidates exist, a candidate will be selected if he/she is closest to the rear camera group and within a corridor having preset lateral boundaries within the rear field of view.

In accordance with another preferred aspect of this invention, the control system includes a user control interface, wherein the control system is configured to be placed in the teach mode in response to a teach input signal manually provided to the user control interface by a user of the autonomous ground vehicle, and wherein the control system is configured to be placed in the repeat mode in response to a route recall input signal. The route recall input signal is provided to the user control interface manually by a person or by an automated command.

In accordance with another preferred aspect of this invention, the autonomous ground vehicle comprises the front camera group and the rear camera group, wherein the control system includes a user control interface, and wherein the autonomous ground vehicle is configured to selectively move over the ground surface in the follow person route or the precede person route in response to an input signal manually provided to the user control interface by a user of the autonomous ground vehicle.

In accordance with another preferred aspect of this invention, the control system includes a user direct interface, and wherein the control system is configured to cause the autonomous ground vehicle to either stop moving over the ground surface, to go forward over the ground surface or go backward over the ground surface in response to a stop signal, a forward signal, and a backward signal, respectively, provided to the user direct interface by a user of the autonomous ground vehicle.

In accordance with another preferred aspect of this invention, the control system comprises a perception subsystem for evaluating the environment in which the autonomous ground vehicle is located and for detecting an obstacle or a person in at least one of the follow person route and the precede person route, whereupon the autonomous ground vehicle automatically avoids the obstacle or person as necessary.

In accordance with another preferred aspect of this invention, the front camera group comprises a pair of stereo cameras providing stereo images of objects and persons within the front field of view, and wherein the rear camera group comprises a pair of stereo cameras providing stereo images of objects and persons within the rear field of view.

In accordance with another preferred aspect of this invention, the control system comprises a sensing module for parsing raw sensory data provided thereto. The raw sensory data comprises at least one of the front camera image and the rear camera image.

In accordance with another preferred aspect of this invention, the autonomous ground vehicle additionally comprises at least one encoder for providing raw sensory data regarding the rotation of at least one of the wheels to the sensing module.

In accordance with another preferred aspect of this invention, the autonomous ground vehicle additionally comprises at least one inertial measurement unit for providing raw sensory data regarding the motion and/or positioning of the robot, such as acceleration, incline, angular rate, and the like, to the sensing module.

In accordance with another preferred aspect of this invention, the control system additionally comprises a perception subsystem, a navigation subsystem and a mobility subsystem. The perception subsystem is configured for evaluating the environment in which the autonomous ground vehicle is located and for detecting obstacles in at least one of the follow person route and the precede person route. The navigation subsystem is configured for determining where the autonomous ground vehicle is located in reference to its surroundings in the environment and for operating on local odometry data and global odometry data. The local odometry data is based on an initial position and orientation of the autonomous ground vehicle with respect to the environment. The global odometry data is GPS data. The mobility subsystem is responsive to signals from the perception subsystem and the navigation subsystem for establishing how the autonomous ground vehicle is to move around the ground surface based on a user-assigned task.

In accordance with another preferred aspect of this invention, the mobility subsystem includes an obstacle handler submodule, in turn a part of the mobility subsystem's path and motion planning module. The obstacle handler submodule is responsible for informing the systems of the robot and permitting the robot to selectively move over the ground surface in a safe manner. The obstacle handler submodule is configured for detecting potential obstacles in at least one of the follow person route, the precede person route, or fully autonomous movement (such as automatic row following operations to be described later) for classifying the detected obstacles as being either traversable, avoidable, or non-traversable, and for causing the autonomous ground vehicle to move along at least one of the follow person route, the precede person route, or its current path of autonomous travel without change if a detected obstacle is traversable, for causing the autonomous ground vehicle to deviate in its movement along at least one of the follow person route, the precede person route, or its current path of autonomous travel if the detected obstacle is avoidable to avoid that detected obstacle, and to slow down or stop in its movement along at least one of the follow person route, the precede person route, or its current path of autonomous travel if the detected obstacle is non-traversable.

In accordance with another preferred aspect of this invention, the environment has at least one row of items and traversable ground defining a path located adjacent the at least one row of items, wherein the taught route extends to the path, and wherein the control system is configured for causing the autonomous ground vehicle to autonomously move along the path.

In accordance with another preferred aspect of this invention, the movement of the autonomous ground vehicle along the path terminates at an end point, whereupon the autonomous ground vehicle moves along the path from the end point to the taught route and then moves along the taught route.

In accordance with another preferred aspect of this invention terrain is one characteristic of the path, and wherein the control system is configured for determining the terrain of the path and to detect an obstacle or a person in at least one of the front field of view and the rear field of view and to cause the autonomous ground vehicle to negotiate the terrain along the path and avoid impacting the obstacle or person.

In accordance with another preferred aspect of this invention, the at least one row of items includes an edge of the items and wherein the control system is configured to determine the edge of the items and to control the autonomous movement of the autonomous ground vehicle along the path.

In accordance with another preferred aspect of this invention, the control of the autonomous movement of the autonomous ground vehicle along the path ensures that the autonomous ground vehicle avoids damaging the items.

In accordance with another preferred aspect of this invention, the payload bed is modular and removable to enable it to be replaced with a particular configuration depending upon a desired use of the autonomous ground vehicle.

In accordance with another preferred aspect of this invention, the control system is configured to operate in a first operational session and at least one subsequent operational session. The first operational session comprises the teach mode and the at least one subsequent operational session comprising the repeat mode.

In accordance with another preferred aspect of this invention, the control system is further configured such that the repeat mode is capable of identifying at least one of the follow person route and the precede person route by identifying the location of the autonomous ground vehicle with respect to global odometry information.

In accordance with another preferred aspect of this invention, the control system comprises a global navigation satellite system (GNSS), such as a global positioning system (GPS), permitting location-aware operation of the system of the robot.

In accordance with another preferred aspect of this invention, the control system comprises a sensing subsystem for parsing raw sensory data provided thereto into one of point cloud data or image segmentation data.

In accordance with another preferred aspect of this invention, the control system is configured to identify at least a subset of the point cloud data or image segmentation data as representative of at least one of the edge of the items or an element of the terrain.

In accordance with another preferred aspect of this invention, the control system further comprises a machine learning module configured to perform the task of identifying the at least a subset of the point cloud data or image segmentation data as representative of at least one of the edge of the items or an element of the terrain by classifying the at least a subset of the point cloud data or image segmentation data and comparing the point cloud data or image segmentation data to data representative of known items or classes of items.

In accordance with another preferred aspect of this invention, the machine learning module is implemented as one or more neural networks.

In accordance with another preferred aspect of this invention, the digital instruction set comprises one or more instructions, one or more of the instructions having at least one variable parameter, and wherein the control system is configured such that a value of the one or more variable parameters of the one or more instructions is set or modified in response to the identification of at least a subset of the point cloud data or image segmentation data as representative of a known item or an unknown item.

BRIEF DESCRIPTION OF SEVERAL VIEWS OF THE DRAWINGS

FIG. 3 is a front elevation view of the exemplary embodiment of the autonomous ground vehicle of FIG. 1;

FIG. 4 is a rear elevation view of the exemplary embodiment of the autonomous ground vehicle of FIG. 1;

FIG. 20 is a flow diagram of the operation of the exemplary embodiment of the autonomous ground vehicle of FIG. 1 to achieve vision-based learning;

FIG. 21 is a flow diagram of the operation of the exemplary embodiment of the autonomous ground vehicle of FIG. 1 in the follow person route mode of operation.

DETAILED DESCRIPTION OF ONE EXEMPLARY PREFERRED EMBODIMENT OF THE INVENTION

Figure 1:
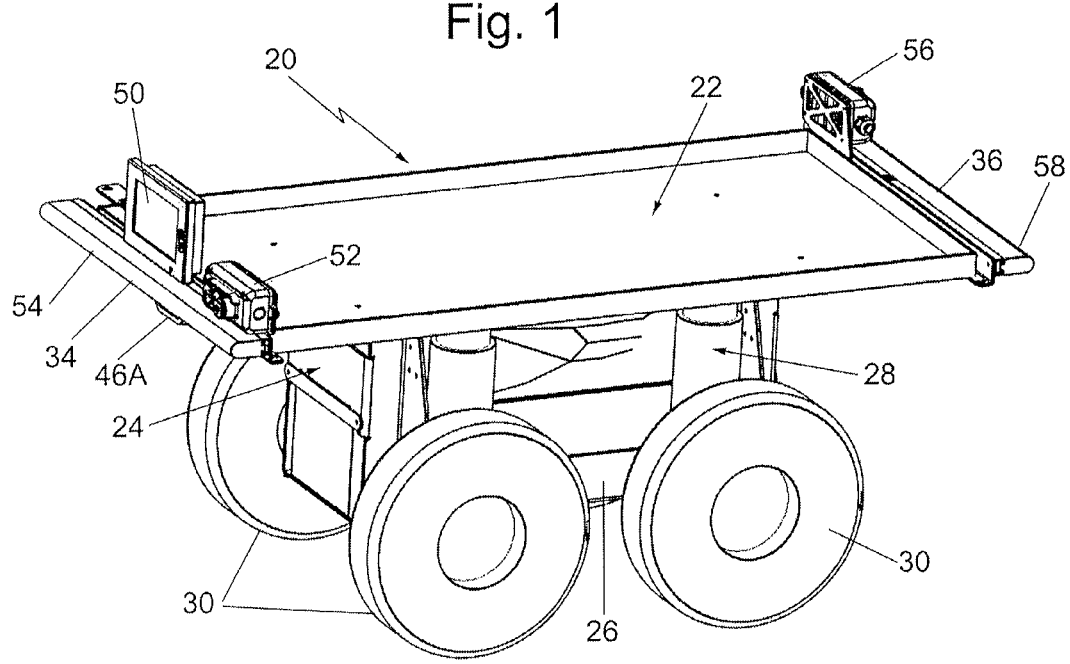
FIG. 1 is an isometric view taken from a top oblique angle of one exemplary embodiment of a collaborative autonomous ground vehicle constructed in accordance with this invention.
Figure 2:
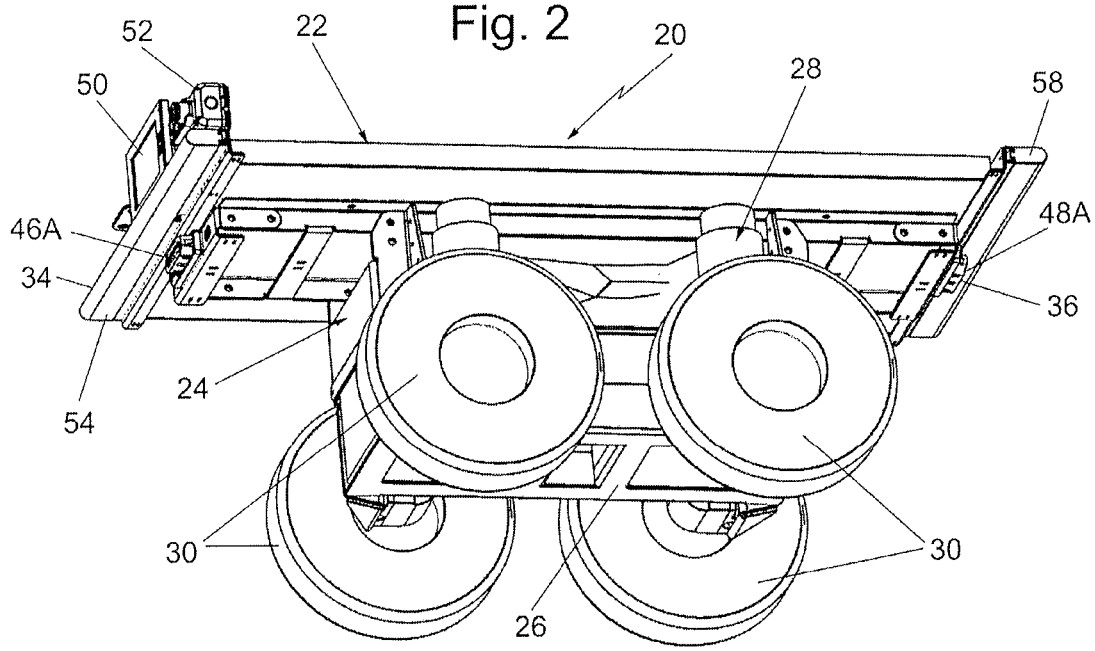
FIG. 2 is an isometric view from a bottom oblique angle of the exemplary embodiment of the autonomous ground vehicle of FIG. 1.
Figure 5:
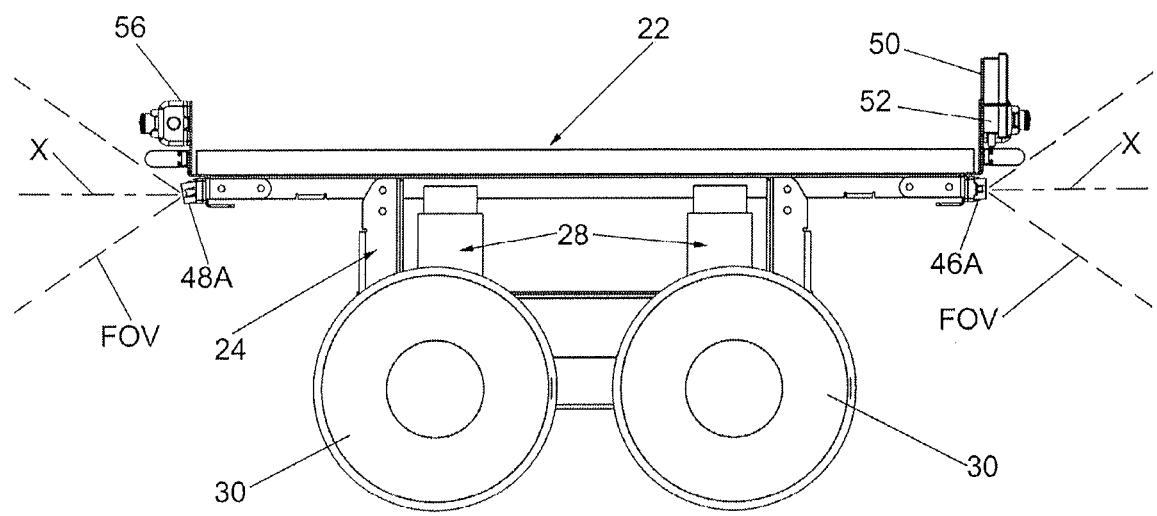
FIG. 5 is a side elevation view of the exemplary embodiment of the autonomous ground vehicle of FIG. 1.
Figure 6:
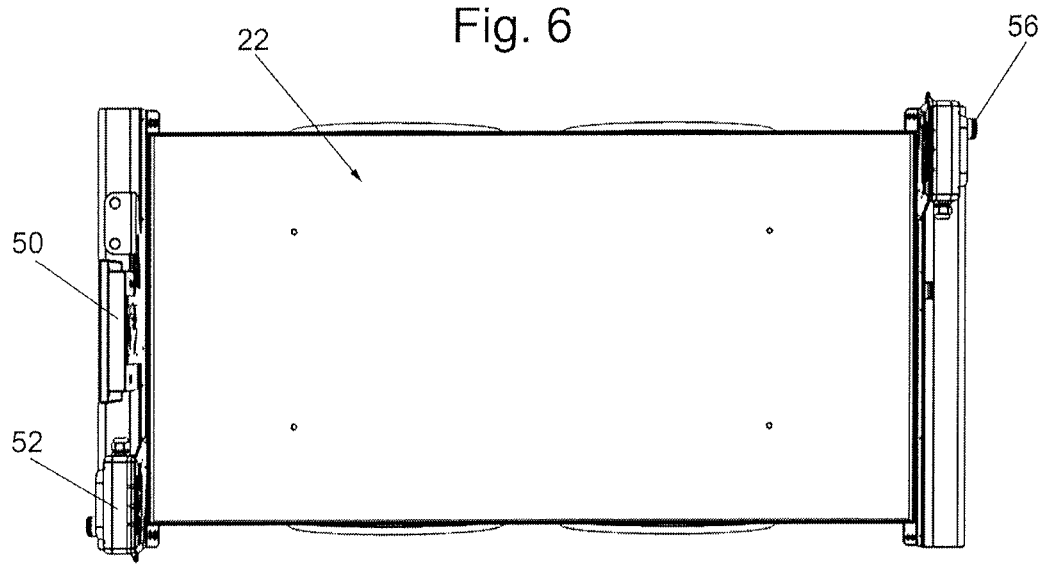
FIG. 6 is a top plan view of the exemplary embodiment of the autonomous ground vehicle of FIG. 1.

Referring now to the various figures of the drawing wherein like reference characters refer to like parts, there is shown in FIG. 1 one exemplary collaborative autonomous ground vehicle 20 constructed in accordance with this invention for carrying out various methods of this invention.

The autonomous ground vehicle 20 of the present invention, also referred to herein as the robot, is designed to operate collaboratively with humans in unconstrained indoor or outdoor environments to more efficiently perform tasks requiring the collection and transport of items within the environment. In particular, the robot 20 is configured to learn paths of travel within the environment through interaction with a human operator, permitting the robot to subsequently and autonomously repeat its travel along such paths.

Moreover, the robot is configured to ascertain its local odometry—its location within its operational environment with respect to a starting position in that environment—and to autonomously navigate the environment, detecting and identifying features thereof and controlling its own movement or other actions in accordance with the environmental information. For example, but without limitation, such autonomous navigation capabilities include: the traversal by the autonomous ground vehicle along the ground surface between rows of items (e.g., crops in a field, racks in a warehouse, etc.); the detection of objects within the robot's surroundings; the identification of such objects or general category in which such objects may be classified; and the determination as to whether the robot may safely navigate over or through such objects or should avoid those objects, such as by diverting its path around the object or stopping. The robot may be additionally configured to ascertain its global odometry—its global position—and autonomously configure its actions based upon that location, such as by guiding itself to a known or designated work environment or other location for execution of the functions described.

With its ability to operate free of fixed physical, electrical, or other pre-determined guides may, the robot 20 can deliver increased productivity in various labor environments where laborers typically engage in repeated movement of materials from one location to another. In an agricultural environment, such as that to be described later, the robot collaborates with laborers to traverse the surface of a field between rows of crops, collect or receive picked crops, and autonomously transport those crops to a packing area. In such use, the robot's autonomous capability of traversing learned routes permits the robot to navigate itself to the rows of crops, travel the length of those rows collecting picked crops, and navigate via a learned route to an unloading area, such as a packing station. In this process, operation of the robot's detection and identification capabilities permit it to avoid unwanted contact with crops, humans, obstacles such as tools and equipment, and other environmental features, thereby avoiding damage or injury to these and to the robot itself. At the outset of such operation and throughout its execution of its tasks, the robot may maintain or deduce its local and global position in order to arrive at, learn, and operate in a work environment. As will also be described later, the robot includes various subsystems to provide it with sensing, perception, navigation, and mobility capabilities enabling it to execute the above functions to deliver this increased productivity to any of numerous other indoor and outdoor environments.

As best seen in FIGS. 1-8 the robot 20 basically comprises a modular vehicle having a payload bed 22 and a wheeled undercarriage or chassis 24. The payload bed 22 is a support member having a generally planar top surface and a short height upstanding peripheral wall. The payload bed is configured to receive items thereon, e.g., baskets of crops collected by the robot during its use in agricultural applications, and is connected to the chassis at a payload interface. The payload interface provides for modular construction and broad usage of the robot. In the exemplary embodiment of the robot 20 shown in FIGS. 1-8 the payload bed is removable and modular, allowing various payload attachments physically compatible with the interface to be secured and removed using known connection methods and without modification to the robot. Such payload attachments may include flatbed or other bed configurations, or tools or machinery consistent with the desired purpose of the vehicle, such as sprayers for herbicides or water.

The chassis 24 basically comprises a frame 26, a suspension system (not shown), four wheels 30 and a drive assembly for the wheels. The suspension system basically comprises a shock absorber and associated components (not shown) for each wheel enabling that wheels to independently move up or down with respect to the payload bed so that the robot can traverse uneven terrain while maintaining the payload bed in a generally horizontal orientation. Each of the wheels 30 is configured to be driven by a rotary drive shaft 32 that is coupled to an associated drive motor 28 (to be described later) forming a portion of the drive assembly and an actuation system 42 (to be described later). The operation of the drive motors is under control of associated motor drivers which make up a portion of a processing system 40 (to be described later) of the robot. In the exemplary embodiment shown, the drive assembly makes use of two motor drivers shown in FIG. 9, namely, a front motor driver 40A and a rear motor driver 40B. Those motor drivers are preferably drive-by-wire controllers configured to control the operation of the motors so that when operated they rotate the drive shafts to cause the wheels to rotate to result in the robot rolling over the terrain in which it is located.

It must be pointed out at this juncture that the collaborative autonomous ground vehicles constructed in accordance with this invention need not include four wheels 30, but can include any desired number of wheels. In fact, they need not include any wheels at all, but can, for example, make use of conventional track drive mechanisms (e.g., so-called "tank" or "caterpillar" treads), or other "walking" or "legged" robotic mobility structures.

The robot 20 has a front end 34 and rear or back end 36 consistent with nominal forward and backward directions of movement of the robot. However, as will be described later, the disclosed operations of the robot 20 are possible in either direction, thereby rendering these front/back and forward/backward distinctions useful for illustrative discussion of those operations, but not limiting or indicative of required directions of operation. The robot's payload bed and chassis are preferably constructed of steel or aluminum for durability, but may be constructed of any particular material suitable for the robot's intended use and environment.

As mentioned earlier the drive assembly may operate as a four-wheel drive system, such that each wheel is powered independently by an electric motor. The vehicle's mobility operation could function capably, however, with an actuated steering system, two wheel drive configuration, tracked wheel system, skid steering system, or other configuration, numerous of which are presently known or may be readily knowable by persons of skill in the art.

The chassis or undercarriage 24 mounts the power generating system for the drive assembly. The power generation system may be embodied by one or more batteries (not shown), such as lead acid or lithium ion type batteries, connected so as to supply appropriate voltage to the drive assembly. The batteries may be removable for ease of replacement and maintenance or conversion to other means of power generation. Such other means of power, which may be used instead of or as a replacement for battery power are known; for example an internal combustion engine and alternator. In any case the power systems of the robot 20 may be chosen based on intended use and likely effect on the overall balance of the robot. Whereas many intended uses may suggest a bottom central mounting location, it is contemplated that another location for such may be chosen, such as when an irregularly shaped payload bed or attachment may otherwise distribute the weight of the robot.

Figure 7:
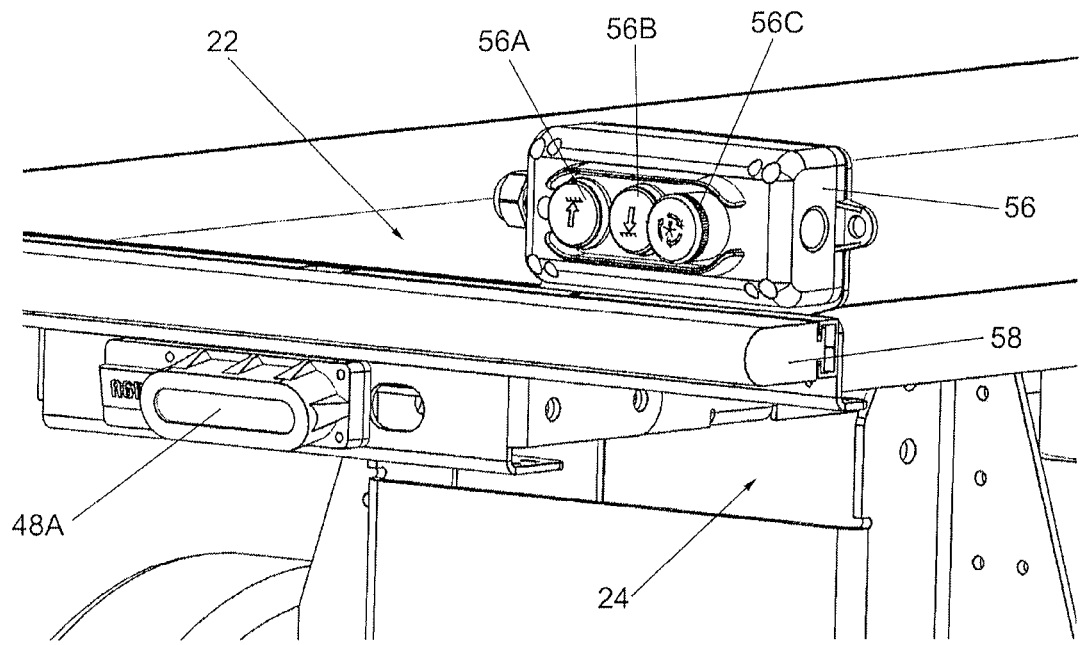
FIG. 7 is a close up isometric view of a rear portion of the exemplary embodiment of the autonomous ground vehicle of FIG. 1.
Figure 8:
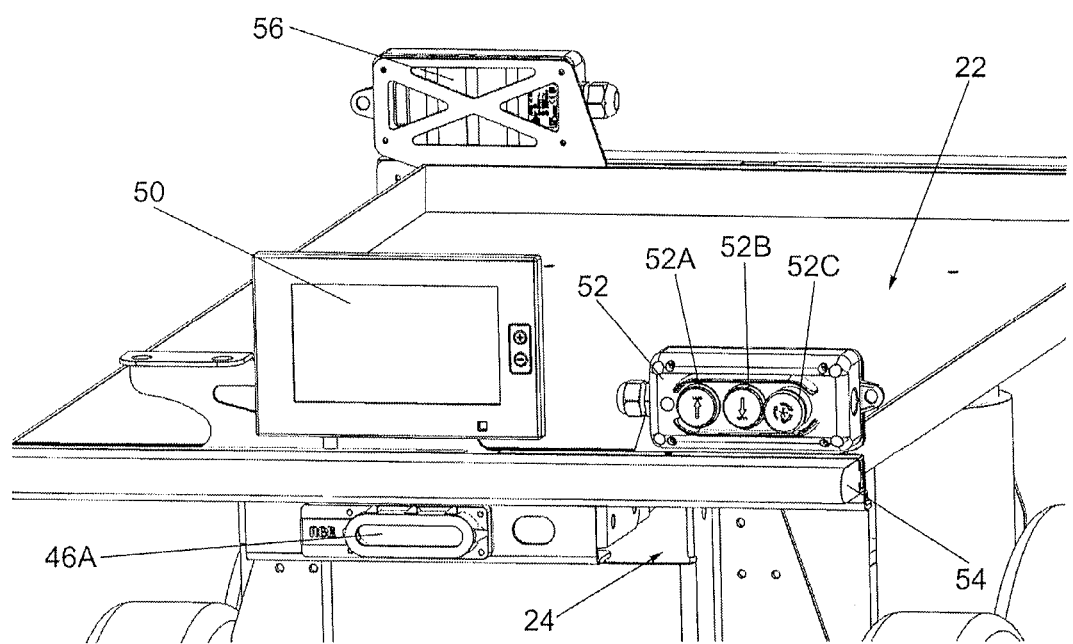
FIG. 8 is a close up isometric view of a front portion, e.g., the user interface, sensors and safety edge, of the exemplary embodiment of the autonomous ground vehicle of FIG. 1.

By way of further detail, FIGS. 7-8 show, respectively rear and front, user direct interfaces 56, 52. Each of these exemplary embodiments comprises a forward direct button 56A, 52A for operation by the user to a generate a forward direct signal that causes the robot to travel in a forward direction, a reverse direct button 56B, 52B for operation by the user to a generate a reverse direct signal that causes the robot to travel in a reverse direction, and a stop button 56C, 52C for operation by the user to a generate a stop signal that causes the robot to stop its motion. The uses of the user direct interfaces 56, 52 and the components thereof are more fully described herein, in particular with reference to FIG. 17.

Figure 9:
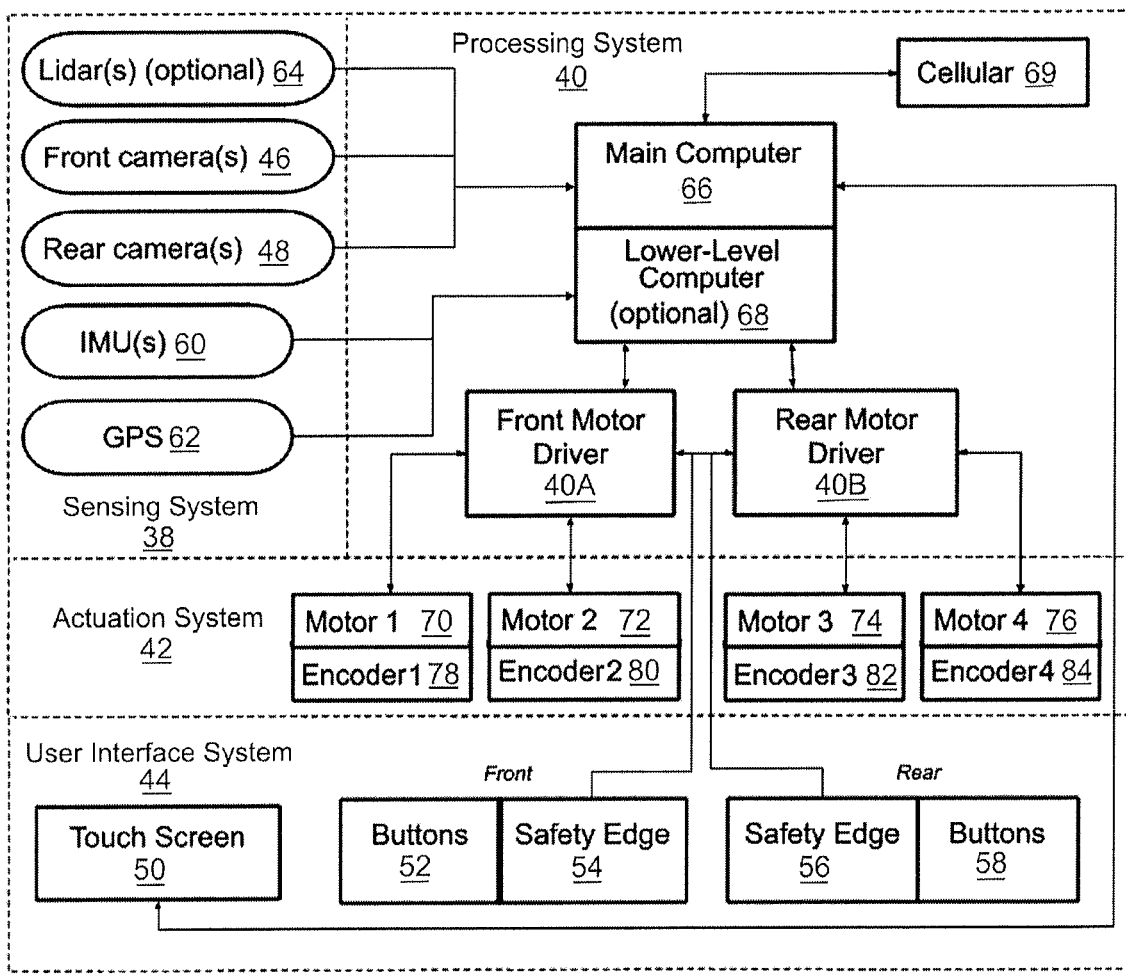
FIG. 9 is a block diagram of the electronic and electrical components, e.g., the sensing, processing, actuation and user interface systems, of the exemplary embodiment of the autonomous ground vehicle of FIG. 1.

The control and autonomous operation of the robot is accomplished by the interaction of four systems making up the robot. Those systems are shown in FIG. 9 and comprise a sensing system 38, the heretofore mentioned processing system 40, the heretofore mentioned actuation system 42, and a user interface system 44.

The sensing system 38 includes any or all of the robot's sensory input devices and is coupled to and interacts with the processing system 38 to provide the robot with the ability to sense its surroundings. In particular, the sensing system includes a front camera group 46, a rear camera group 48, and other components (to be described later). The front camera group 46 is mounted in a housing 46A on the chassis proximate to the front end 34 and the rear camera group 48 is mounted in a similar housing 48A on the chassis proximate the rear end 36. Each camera group includes at least one camera. The front camera group 46 of the exemplary robot 20 is in the form of a pair of stereo infrared cameras (not shown) mounted in the housing 46A. The rear camera group 48 of the exemplary robot 20 is in the form of a pair of stereo infrared cameras (not shown) mounted in the housing 48A. Other embodiments of the robot may utilize these or other types of cameras, such as, without limitation, color, grayscale, or event cameras. Each camera group provides stereo images of objects and persons within the camera group's field of view (FOV). The field of view of the front camera group 46 is illustrated by the broken lines in FIGS. 3 and 5. The field of view may be configured in its horizontal and vertical angles centered side-to-side and up-and-down, respectively, about the central longitudinal axis X of the robot 20 to suit the intended environment of operation or to provide improved performance as necessary and/or appropriate. Such configuration may be informed by reference to industry specifications, such as ANSI/ITSDF B56.5 which states at § 8.11 with respect to object detection devices that "[a] sensing device or combination of devices shall be supplied to prevent contact of the vehicle structure and installed equipment with people or objects appearing in the path of the vehicle in the main direction of travel." The field of view of the rear camera group 48 is illustrated by the broken lines in FIGS. 4 and 5 and basically is configured analogously to the field of view of the front camera group, but extends from the rear camera group backward.

Also proximate to each of the front end 34 and rear end 36 of the robot are front and rear user interfaces forming a portion of the user interface system 44. In particular, the illustrated exemplary embodiment of the robot 20 the user interface at the front of the robot is in the form of a touch screen 50, front buttons 52 and a front safety edge 54. The user interface at the rear of the robot is in the form of rear buttons 56 and a rear safety edge 58.

Users of the robot interact with the robot through the user interface to control the behavior of the robot while it is executing its functions. The button interface shown is identical on the front and rear to enable equivalent operation in forward and backward directions. The touch screen 50 is provided to enable the user to touch various portions of it to effect some operation of the robot. For example, a portion of the touch screen can include an upward facing arrow icon, which when touched will cause the robot to move forward to autonomously take a learned route. Another portion can include a downward facing arrow icon, which when touched will cause the robot to move backward to autonomously take a learned route. Still another portion of the touchscreen can include a stop sign icon, which when touched will cause the robot to stop. The touchscreen 50 in the exemplary embodiment 20 is shown located on just one end of the robot to save cost. However, there may be a touch screen on both ends. In the illustrated embodiment the front and rear user interfaces are redundant, permitting interaction by a human user with the robot in an identical manner from either end of the robot vehicle platform. One skilled in the art will understand that such redundant interactivity, while not necessary, will facilitate certain operations of the robot, such as the robot's ability to both follow and precede a human user. Such redundancy could be obtained in other ways, such as by placing the user interfaces on the respective sides of the robot, without deviating from the spirit of the present disclosure. It is further instructive to reiterate that the aforementioned nominal nature of "front" and "rear" throughout this disclosure render the disclosed robot capable of initiating either of such follow or precede capabilities in either direction and that reference to "front" and "rear" with respect to any single operation need not cause that designation to describe the directional context of the next operation of the robot.

The front safety edge 54 is provided for the avoidance of damage to the robot or objects in the environment or injury to the human user. To that end, it is coupled to and in bi-directional communication with the front motor driver 40A, whereupon movement of the robot will be stopped if the front safety bar engages an object or person. The rear safety edge 56 serves a similar purpose and is coupled to and in bi-directional communication with the rear motor driver 40B.

As mentioned earlier the sensing system 38 includes other components than the front and rear camera groups 46 and 48, respectively. Those other components include odometry components, e.g., inertial measurement units ("IMU(s)") 60, a global positioning system ("GPS") unit 62, and optionally one or more LIDAR units 64. The IMUs serve to sense forces indicative of movement or position of the robot, such as acceleration, angular rate, or incline. The optional LIDAR unit(s) is/are configured to measure distance to a target by illuminating the target with laser light and serves to obtain data suitable for processing as a form of visual image of the environment of the robot and elements thereof.

It should be pointed out at this juncture that the robot 20 may include more than one of a particular sensory input component and other sensory input devices may also be employed consistent with this disclosure for collecting environmental data for use in the operation of the robot.

As best seen in FIG. 9, the processing system 40 basically comprises a main computer 66, an optional lower-level computer 68, and a cellular module 70, along with the heretofore identified front motor driver 40A and rear motor driver 40B. The lines within FIG. 9 show the interconnection of the various components of the systems shown therein, with the arrowheads of those lines indicating the direction of data flow within and between the various components, be they hardware components and/or robot autonomy software modules and submodules to be described later.

Each of the computers of the processing system includes one or more processors, e.g., microprocessors, and receives data in the form of digital signals from the sensing system 38, the user interface system 44, and the actuation system 42. In particular, the main computer 66 of the processing system can be of any suitable construction, such as a standard PC with a graphics processing unit or a System-on-Module (SOM), and receives input signals from the front and rear camera groups 46 and 48, respectively, and the optional LIDAR unit 64 of the sensing system 38. It is also in bi-directional communication with the touch screen 50 and with the cellular unit 70. The lower-level computer 68 can be of any suitable construction, such as a field programmable gate array (FGA), programmable logic controller (PLC), microcontroller, Advanced RISC Machine (ARM), or similar, and receives input signals from the IMUs 60 and the GPS module 62. It is also in bi-directional communication with the main computer 66 and with the front motor driver 40A and the rear motor driver 40B. Persons of skill in the art will understand that known data connection structures and processes, such as busses, may physically couple the outputs of the sensing system 38 individually to the main computer 66 and lower-level computer 68 or may bus those outputs together, as shown in FIG. 9, without deviating from the scope and spirit of this invention. As shown with respect to this FIG. 9, a lower-level computer 68 may be omitted, whether based upon cost savings or technical or other deciding factors. In such instance, the main computer 66 will perform the operations otherwise described as being performed by the main computer 66 and/or the lower-level computer 68. While the exemplary architecture of FIG. 9 employs uni-directional arrows in certain portions to represent the direction of data flow from sensors, it will also be understood that such representation should not be read to limit communication between components of the architecture, which may be bi-directional where desirable.

The actuation system 42 basically comprises four drive motors, 70, 72, 74, and 76, one for each of the four wheels. The actuation system also includes four encoders, e.g., shaft encoders 78, 80, 82, and 84 for the respective motors 70, 72, 74 and 76. The motor 70 (i.e., "motor 1") and its encoder 78 is in bi-directional communication with the front motor driver 40A. The motor 72 (i.e., "motor 2") and its encoder 80 is also in bi-directional communication with the front motor driver 40A. The motor 74 (i.e., "motor 3") and its encoder 82 is in bi-directional communication with the rear motor driver 40B. The motor 76 (i.e., "motor 4") and its encoder 84 is also in bi-directional communication with the rear motor driver 40B. As noted earlier while the robot 20 as described above includes four wheels, collaborative autonomous ground vehicles constructed in accordance with this invention may include less or more wheels. Thus, any wheeled embodiment of the invention will include such motors and encoders for each wheel for actuation of the mobility functions of the robot described herein.

The processing system 40 is configured to process sensory input and information from the encoders and, through the appropriate motor drivers sends properly structured data or signals representative of translational and rotational velocity commands to the appropriate encoder, which applies them to the wheel's motor, thereby causing the wheel receiving such command information to turn or rotate. It should be understood that such commands and the selected runtime operational parameters resulting in those commands will be determined by the programming of the robot and may incorporate data from any portion of the system capable of communicating its data to the processing system 40. This may, in some embodiments, include one or more cellular communication processing components or units 69 for receiving and/or sending data from or to the processing system computer(s).

In general, the operation and functionality of the robot 20 rely on the robot autonomy software ("RAS") as a middleware layer logically arranged between the physical components of the robot vehicle platform and the computing and processing systems of the robot. This middleware layer facilitates the exchange of parameters, data messages, and service call requests between different parts of the autonomous ground vehicle software and hardware systems. This includes the processing of sensory input from the various sensory input mechanisms of the sensing system and output of data messages or electrical control to the motor drivers.

Figure 10:
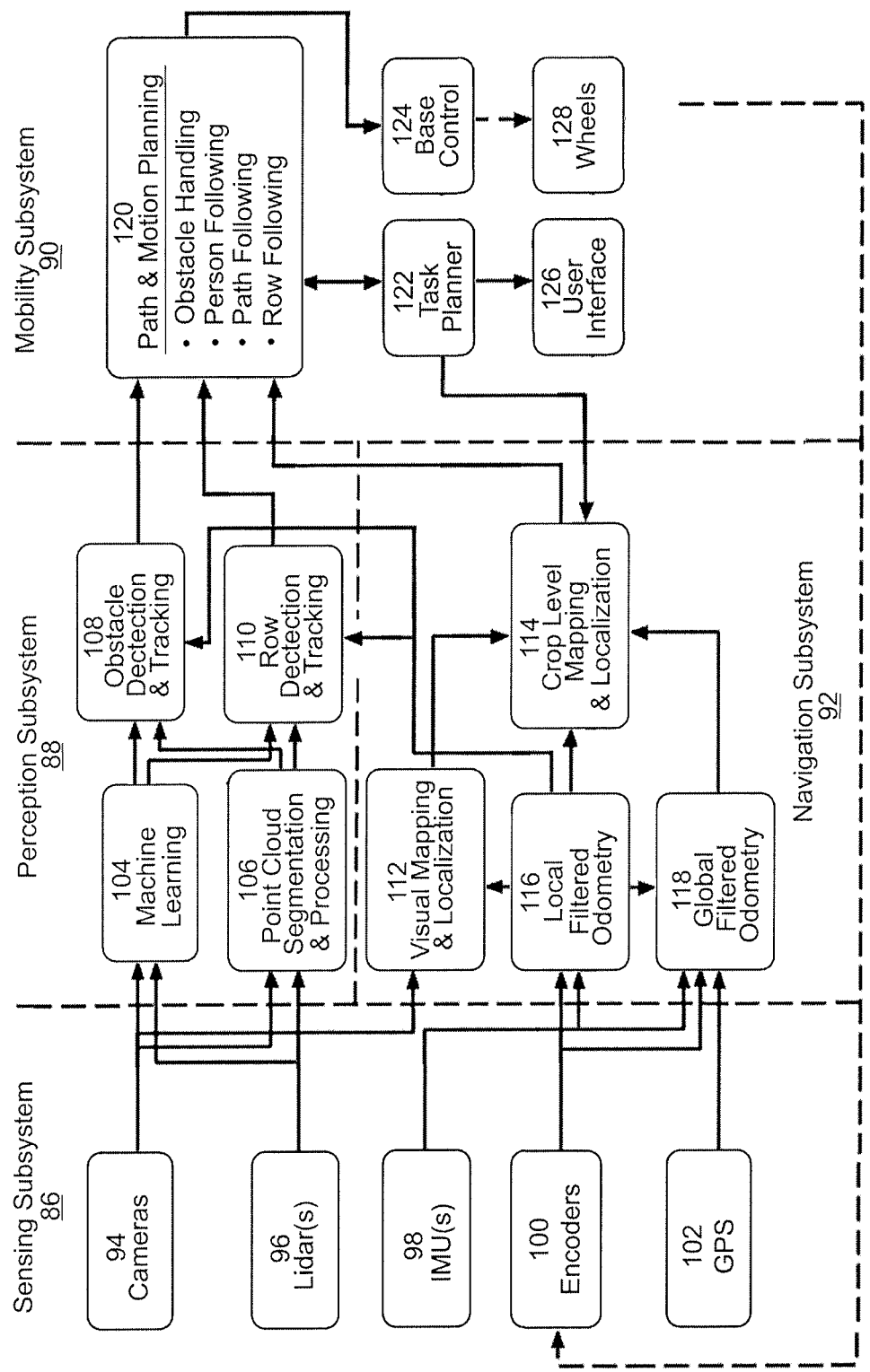
FIG. 10 is a block diagram of the control system for autonomous or electronically commanded operation of the autonomous ground vehicle including the sensing, perception, mobility and navigation subsystems of the exemplary embodiment of the autonomous ground vehicle of FIG. 1 for operation of and communication with the components of the autonomous ground vehicle shown by FIG. 9.

The RAS of an exemplary embodiment of the collaborative autonomous ground vehicle 20 is comprised of four subsystems shown in FIG. 10, namely, a "sensing subsystem" 86, a "perception subsystem" 88, a "navigation subsystem" 90, and a "mobility subsystem" 92. Each of these subsystems, as will be described hereinafter, is in turn comprised of modules for specialized processing of data derived or obtained by or fed to that subsystem. These subsystems generally represent software, firmware, drivers, wrappers, and the like for the operation of, communication with, and processing of data from the systems described with reference to FIG. 9. FIG. 10 is a block diagram of the logical layout and segmentation of the RAS and its subsystems and shows the flow of data between the various subsystems. To that end, the lines with the arrowheads in FIG. 10 show the interconnection of the various modules of the subsystems, with the direction of the arrowheads indicating the direction of data flow within and between the various modules. The sensing subsystem 86 is comprised of modules for parsing raw sensory data in a unified format from the sensing system previously described. The perception subsystem 88 evaluates the environment of the robot, including identifying the location of the robot and detecting any obstacles in the robot's path of travel within that environment. The navigation subsystem 90 determines the location of the robot with reference to its surroundings in the environment through evaluation of local odometry data and global odometry data, where the local odometry data is generated based upon the initial position and orientation of the robot. The global odometry data is, for example, obtained through global positioning system (GPS) information. The mobility subsystem 92 is responsive to user input representing task assignment, used in combination with signals from the perception and navigation subsystems to control movement of the robot by generating appropriate motor drive commands.

Modules comprising the sensing subsystem 86 support accompanying hardware, and thus, consist of device drivers in conjunction with RAS wrappers, providing programmatic/operational system access to the low level operations of each device in the specific context of the robot's systems. It will be understood that such device drivers may be those supplied directly by the manufacturers of the relevant component hardware, drivers or wrappers available as part of RAS open-source software repositories, or those developed specifically for control of the hardware unique to a particular implementation of an instance of the autonomous ground vehicle. Reference is made in FIG. 10 to exemplary parsing modules of the sensing subsystem 86 with respect to the architectural components with which each module is associated. In particular, the exemplary sensing subsystem 86 includes a cameras module 94, a LIDAR(s) module 96, an IMUs module 98, an encoders module 100, and a GPS module 102.

As was described with respect to the physical systems of the robot, multiple instances of certain architecture may be employed. In turn, multiple sensing modules of one type may be employed or a single sensing module may be associated with multiple instances of the corresponding physical systems architecture.

The perception subsystem 88 basically comprises a machine learning module 104, a point cloud segmentation and processing module 106, an obstacle detecting and tracking module 108, and a row detection and tracking module 110. The modules of the perception subsystem establish two logical stages of functionality. First, outputs of the sensing subsystem acting upon raw sensory data from the visual or other detection input devices, for instance the images provided by the camera groups 46 and 48 or the data/images provided by LIDAR devices 64, are processed to generate formatted data representative of the environment and any persons or objects in that environment. Such process may be accomplished, for example, by the machine learning module 104 utilizing machine learning algorithms like that known to one of skill in the art or by the point cloud processing and segmentation module 106, similarly utilizing point cloud algorithms known to those of skill in the art. Each of the foregoing modules of the perception subsystem is discussed more fully herein with respect to particular uses and other exemplary features of this embodiment of the robot. At the second stage, the perception subsystem provides this structured environment data to the obstacle detection and tracking module 108 and row detection and tracking module 110.

By way of further example, output data of the camera module 94 of the sensing subsystem 86 is processed by the machine learning module 104, implemented as a neural network. More specifically, the machine learning module 104 is a neural network based classifier. While numerous types of camera data may be provided as inputs to the classifier within the scope of this invention, exemplary camera module output is a representative image, including physical depth data at each pixel of a frame, generated by the stereo pair of infrared cameras making up the camera groups 46 and 48.

Used in an agricultural environment, the machine learning module 104 is trained using appropriate datasets in order to permit classification of a mix of generalized objects in addition to specialized objects belonging to the agricultural work environment. These specialized objects may include crops, ground features, work apparatus (e.g., wheelbarrows, ladders, etc.). Identification and classification of generalized objects may be facilitated by the use of publicly available datasets through known methods. See e.g., Table A #8, found later in this specification. The output of the classifier is a set of bounding boxes on the image provided by the camera module output indicating the location of individual detections, and a classification confidence level per object indicating the probability of a correct classification. In the exemplary embodiment, the objects with confidence levels below a set threshold, e.g., for example, but not limitation 0.7, are discarded. Conversely, a subset of the classes of objects the network can identify, including people, is deemed reportable. If a classified object does not belong to this subset, it is discarded. The remaining objects are communicated in the form of an ROS message containing corresponding class labels, two-dimensional bounding boxes, and confidence levels. These outputs of the classifier are reported to the obstacle detection and tracking module 108. Some portions of the classification process may be achieved by use of known real-time object detection methodologies and frameworks, such as YOLO and Darknet, or similar, in combination with the unique and novel features described herein. See Table A #6, #7.

The obstacle detection and tracking module 108 is responsible for detecting persons and objects within the field of view of the camera groups and for first converting the bounding boxes on the image captured by the cameras into three-dimensional boxes located in a local odometry frame. The obstacle detection and tracking module 108 additionally tracks these detected objects within that local odometry. In order to generate the three dimensional bounding box from the two dimensional image data the bounding box is applied on a corresponding depth image—an image whose pixel value represents its distance to the image plane, which is generated from a stereo pair of cameras such as by the method taught in Fua—as a mask. See Table A #9. The median depth of this mask may then be used as the object's distance to the image plane. With this depth measurement and transformations between various coordinate frames, the image plane coordinates are transformed to a frame with reference to the body of the robot and a local odometry frame. Transformed objects are then reported to the obstacle tracker module and may include this depth information.

The classification processes just described may be similarly accomplished by the point cloud segmentation and processing module 106 in place of, or in addition to, the machine learning module 104, and as more fully described throughout this disclosure.

The obstacle detection and tracking module 108, is preferably implemented as a multi-object tracker relying on a First Order Linear Kalman Filter. Such filter techniques can be like those of prior art teachings such as Zarchan, see Table A #1. Tracked objects may be referred to as "tracks." Each track is represented in the robot's local odometry frame. In the exemplary embodiment, a constant velocity is assumed to be non-zero for those classified as dynamic objects, including but not limited to people, whereas for those classified as static objects, the constant velocity is assumed to be zero. This implementation enables the possibility of an object moving out of the field of view of the robot momentarily and yet the robot will be able to keep maintain its track, a capability more fully described in this disclosure with reference to the autonomous operations of the robot which will be discussed later.

The obstacle tracker of the detection and tracking module 108 is preferably specifically implemented by the following method: Detected objects are processed and classified by comparing the system's confidence of a particular classification to a preset confidence threshold for a relevant class of objects, e.g., persons, crops, non-traversable stationary objects, or specialized objects likely to be present in the environment of intended use, such as wheelbarrows or bins in an agricultural setting. Where the minimum confidence threshold is met for the encountered object, be it a person or a thing, the object may be classified and tracked. For confidence values below the threshold, the individual detection is discarded. For a tracked object the system predicts the position and velocity of the object via a Kalman predict step. The detections are processed to determine potential matches to existing tracks, such as by the Global Nearest Neighbor data association method taught by Konstantinova, see Table A #11. Based on this scheme an individual detection can match at most one track. Any unmatched detection may be recognized as a new track. For detections with matched tracks, the detections are used as new observations for the corresponding tracks, and a Kalman update step is performed. This information may be utilized in more detailed environmental mapping operations described with reference to FIG. 14. For detections with no tracks, new Kalman tracks based on initial observations are created. Utilizing iterative observations and timestamp data for each detection, tracks with no observations for a sufficient period are deemed inactive and removed. This is done by imposing a threshold on the state covariance. The covariance grows in the absence of observations. In addition, it grows faster for non-stationary objects due to the non-zero constant velocity model. This step ensures that tracks for dynamic objects are not maintained for too long, which may potentially result in erratic system behavior. Upon completion of an iteration of the obstacle tracking algorithm, the module outputs as a ROS message a list of tracked obstacles represented by bounding boxes and object classes.

Figure 11:
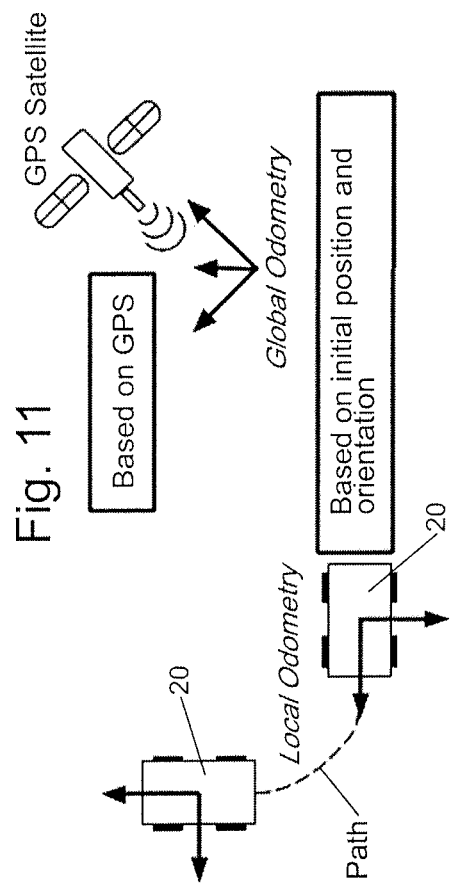
FIG. 11 is an illustration showing the operation of the navigation subsystem of the exemplary embodiment of the autonomous ground vehicle of FIG. 1 shown recovering its position and orientation with respect to two frames of reference.

The navigation subsystem 92 basically comprises a visual mapping and localization module 112, a crop level mapping and localization module 114, a local filtered odometry module 116 and a global filtered odometry module 118. The navigation subsystem is configured to operate to recover the robot's location relative to two environment-centric frames of reference, namely, local odometry and global odometry frames, as illustrated in FIG. 11 wherein the robot 20 is shown taking a particular path. In particular, the visual mapping and localization module 112 utilizes feature-based pose estimation based upon camera module data from the sensing subsystem, with reference to the local odometry frame, the robot's current position and orientation, and the robot's position and orientation in the beginning of the session. The local filtered odometry module 116 contributes data to the determination of local odometry through input from one or more IMU's and wheel encoder data. The local filtered odometry module thus can compute an instantaneous position and orientation of the body of the robot 20 itself relative to its starting position and starting orientation based on that initial orientation and position and its observed data from its IMU's and wheel encoders, such as acceleration and angular rate, over the period of time elapsed. The global filtered odometry module 118 operates similarly utilizing input from the one or more IMU's and wheel encoder data in conjunction with GPS information from a satellite shown in FIG. 11 to recover the robot's location with respect to global odometry, a global frame of reference. The crop-level mapping and localization module 114 gathers the outputs of the row detection and tracking module 110 of the perception subsystem 88 in combination with the outputs of the other modules of the navigation subsystem 92. With these combined inputs, the crop-level mapping and localization module 114 generates a mapping and localization paradigm unique to the work environment in which the robot is deployed. In the exemplary embodiment operation of the crop-level mapping and localization module 114 is initiated by the task planner module 122 in response to requests from the user interface module 126.

In addition to the foregoing frames of reference the robot is capable of operating with respect to a self-referential body frame of reference, wherein the body frame coordinates of an object in the environment represent the object's location relative to the robot's current position and orientation.

The mobility subsystem 90 is configured to respond to user input representing task assignment, used in combination with signals from the perception subsystem 88 and the navigation subsystem 92 to control movement of the robot 20 by generating appropriate motor drive commands for controlling motor velocities. The mobility subsystem 90 basically comprises a path and motion planning module 120, a task planner module 122, a base control module 124, a user interface module 126 and a wheels module 128. The path and motion planning module 120 is configured to receive data and signals from the task planner module 122 and, based thereon, generate and send translational and rotational velocity commands to the base control module 124. The task planner module 122 is configured to process signals generated by operation of the user interface and deliver its output to the path and motion planning module 120. These path and motion planning module 120 and task planner module 122 are arranged for bi-directional communication to permit interactive use and operation based on user input and prompting. Similarly, bi-directional communication between the task planner module 122 and user interface module 126 permit the sending of information for display to the user.

The base control module 124 is configured to convert the commands from the path and motion planning module 120 into encoder ticks per second and apply them, via the wheel module 128 to the motor drivers, which in turn rotate the motors, and thus, wheels, accordingly.

The user interface module 126 is configured to receive user input from the user interface and provide information to the user via the user interface and communicates with the task planner module 122 in assistance and operation of the tasks of the path and motion planning module 120.

The wheels module 128 is configured to receive instruction from the base control module 124 and communicate rotation commands to the wheel encoders 100.

While uni-directional arrows in this FIG. 10 are shown with respect to certain modules, it will be understood that such generally represents the flow of data but bi-directional communication may be implemented in any of these connections.

Figure 12A:
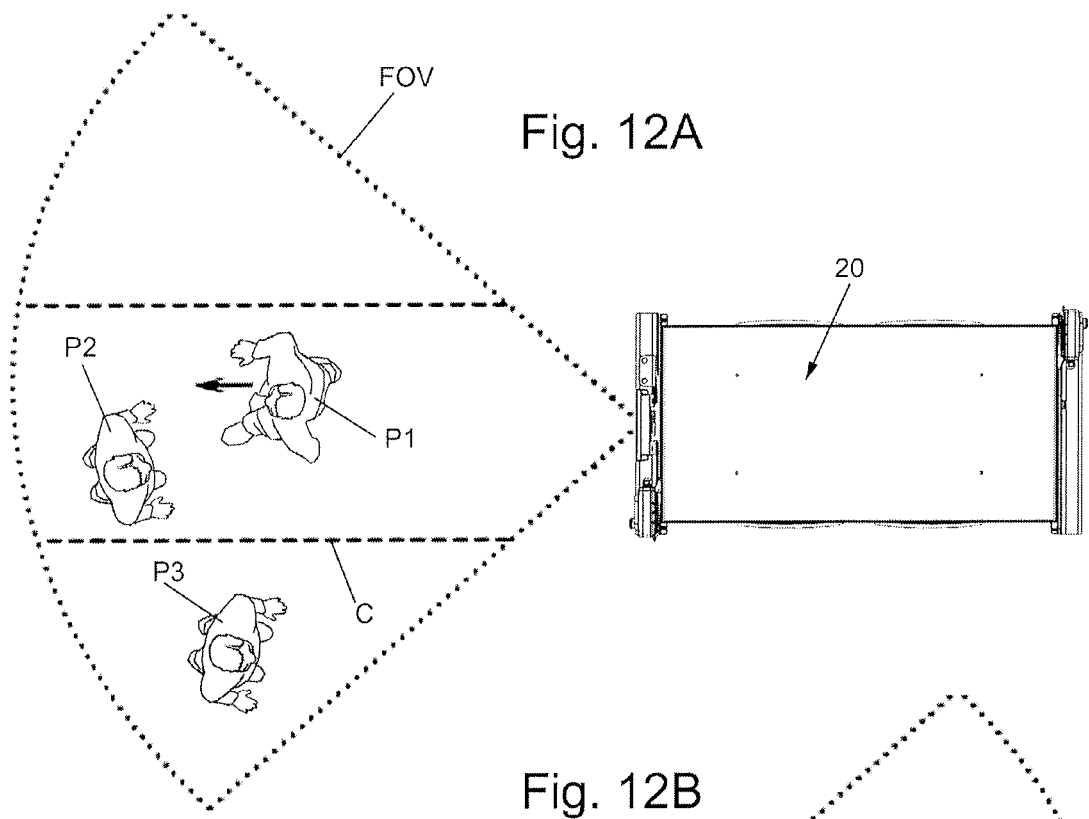
FIG. 12A is an illustration showing the operation of the exemplary embodiment of the autonomous ground vehicle of FIG. 1 during its "follow person route" mode of operation.
Figure 12B:
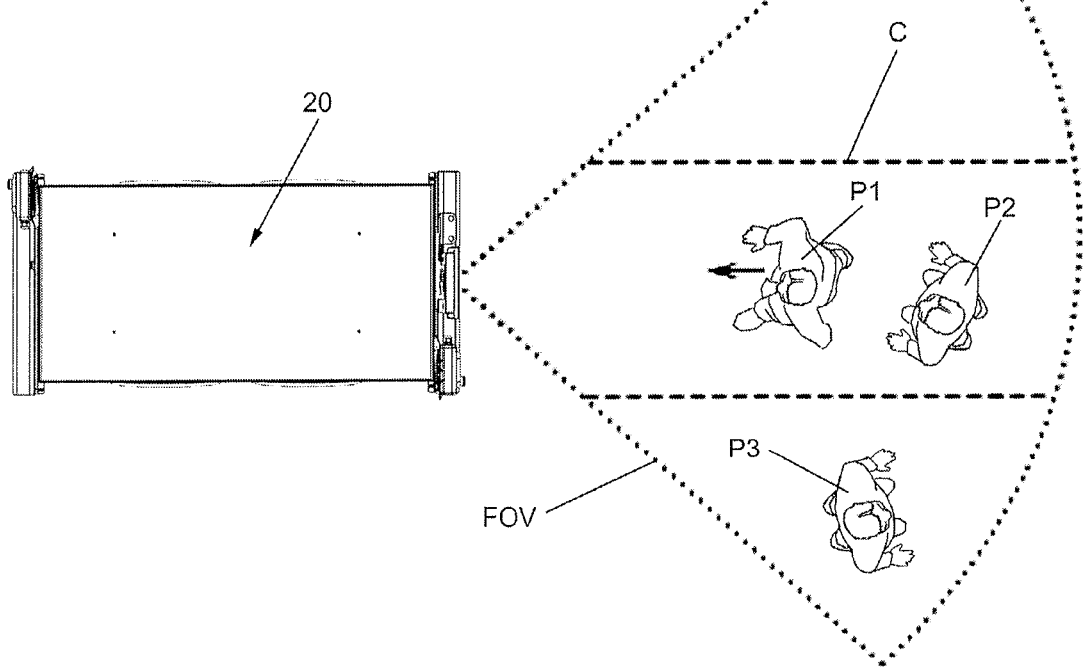
FIG. 12B is an illustration showing the operation of the exemplary embodiment of the autonomous ground vehicle of FIG. 1 during its "precede person route" mode of operation.

The robot 20 is configured to operate in either a "follow person" mode of operation or a "precede person" mode of operation. In the follow person mode (also sometimes referred to as the "person follow" mode) the robot automatically follows a person walking in front of the front end portion of the robot and within the front field of view of the front camera group, whereupon the robot will learn the route taken while following the person. In the precede person mode (also sometimes referred to as the "person precede" mode) the robot automatically precedes a person walking in behind of the rear end portion of the robot and within the rear field of view of the rear camera group, whereupon the robot will learn the route taken while preceding the person. FIGS. 12A and 12B illustrate, respectively, the initiation of the robot's person following and person preceding modes or behaviors. As previously described, the sensing and perception subsystems operate to detect obstacles and track them. In the case in which the robot is placed in a follow or precede operational mode, it must detect one or more objects (i.e., persons) in the field of view of its front camera group (for following) or rear camera group (for preceding), classify those objects as in fact human follow/precede candidates, and then select one of those candidates to follow/precede.

In the exemplary operational scenario of FIG. 12A, the robot is placed in follow mode by operation of the user interface. By virtue of the robot's detection and classification capabilities, all persons within the field of view of the front camera sensor may be considered follow candidates. Therefore, the robot is programmatically configured for appropriate selection criteria suitable for the intended environment. By way of example, it may be required that the robot be stationary before selecting a follow person. Further a maximum radius or linear distance from the sensor to a follow candidate may be employed, whereby those persons outside that maximum parameter are excluded. The exemplary RAS is further configured to consider only persons moving at a speed above a set threshold. Additional parameters may be established, such as requiring that a follow candidate be eliminated from consideration unless he/she is within a corridor whose lateral boundaries are within an established dimension relative to, for instance, the field of view or robot vehicle platform. In the case where multiple follow candidates exist, the exemplary robot may also determine to select only the candidate closest to the robot. It will be understood that programmatic configuration of the robot permits the consideration of all or any of the foregoing parameters and potentially unequal weighting of those parameters in the selection process. Similarly, it should be understood that the systems of the robot are controlled by its programming and that additional or different selection criteria may, therefore, be used. With respect to these and other configurable parameters of the RAS it is possible to establish and fix a configuration of the parameters or make them accessible for configuration by a user in any of various well-established ways, such as by operation of the user interface, connectivity to an external device, or wireless delivery of parameter updates.

In the example of FIG. 12A, three persons P1, P2, and P2, who are potential follow candidates are within the field of view (FOV) of the front camera group 46. Assuming that the robot 20 has not yet selected the person to be followed, if candidate P1 is detected within a centrally located corridor C within the field of view and moving in the direction indicated by the arrow at a speed greater than a minimum follow candidate threshold speed, whereas candidates P2 and P3 are stationary, based on the exemplary algorithm presented above, candidate P1 will be selected by the robot to be the person to be followed. The minimum follow candidate threshold speed can be selected by a user of the robot based upon the application to which the robot will be put. The central corridor is established by the programmatic parameters of the above example algorithm. With that algorithm candidate P3 will be ignored, even if he or she was moving with a sufficiently high speed as long as the P3 candidate remained outside the centrally located corridor C. Candidate P2 will also be ignored because he/she is not moving. Even if candidate P2 was in motion, candidate P1 is closer to the robot and in motion, and is therefore selected in accordance with the exemplary algorithm.

The foregoing example, illustrated with reference to FIG. 12A and the follow mode of the autonomous ground vehicle will be understood to function analogously in precede mode, as illustrated in FIG. 12B, where the field of view is determined with respect to the rear camera group 48 and the speed of a precede candidate is considered as the candidate P1 approaches the rear end of the robot vehicle as shown by the arrow in that figure, as opposed to the follow candidate P1 moving away from the robot in follow mode shown in FIG. 12A. Again, candidate P2 will be ignored as he/she further away from the robot than candidate P1. Candidate P3 is similarly ignored based on his/her location outside the bounds of the central corridor C.

Having selected a follow person or precede person mode of operation, the perception subsystem of the RAS commits this person to the obstacle detection and tracking module 108 as an actively tracked object, further classified as a person and, more specifically, a follow/precede person. This includes, in follow person or precede person mode, generating for use by other modules of the system a list of all tracked objects classified as a person. The obstacle tracker of the module 108 maintains and updates position and information data regarding the follow person/precede person and publishes this information as a ROS message to other modules of the RAS. The position and velocity of the follow/precede person is updated with each iteration of this action. Based upon this changing information, the path and motion planning module of the mobility subsystem generates translational and rotational velocity commands, which it outputs to the base control module. The base control module executes these commands to operate the physical movement of the robot, permitting it to follow/precede the follow/precede person.

In part, the operation of the base control module 124 and path and motion planning module 120 of the exemplary system described may utilize velocity vector data generated by the person follow/precede behavior in order to generate appropriate velocity commands for the robot's movement that translate to safe and graceful operation of the robot with respect to itself, any payload, and its surroundings, including humans. The processing of this velocity vector data may be accomplished by known methods, such as taught in Ilhan, 2018. See Table A #5.

Figure 13A:
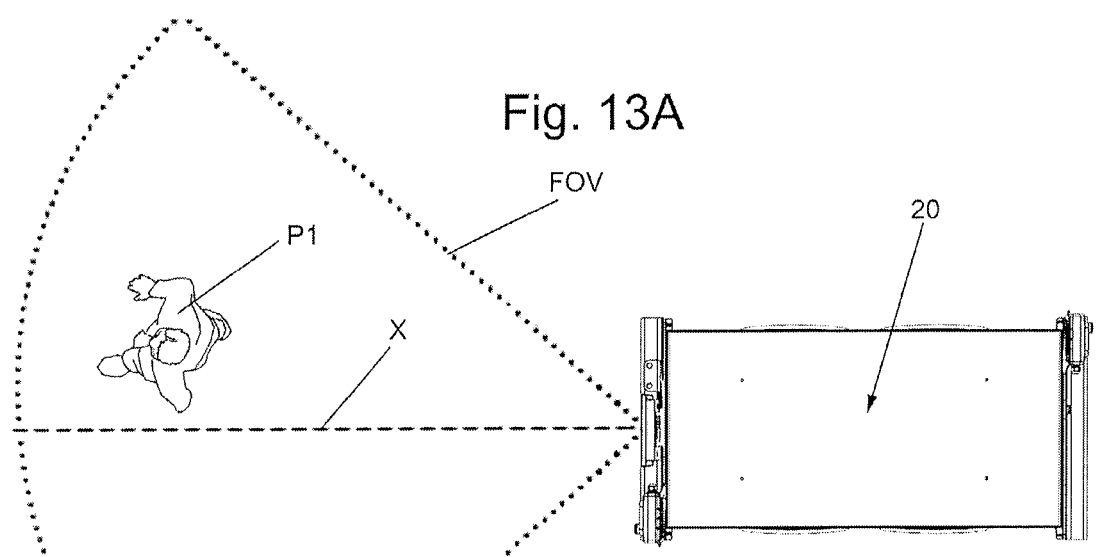
FIG. 13A is another illustration, similar to FIG. 12A, showing the operation of the exemplary embodiment of the autonomous ground vehicle of FIG. 1 during the follow person route mode of operation.
Figure 13B:
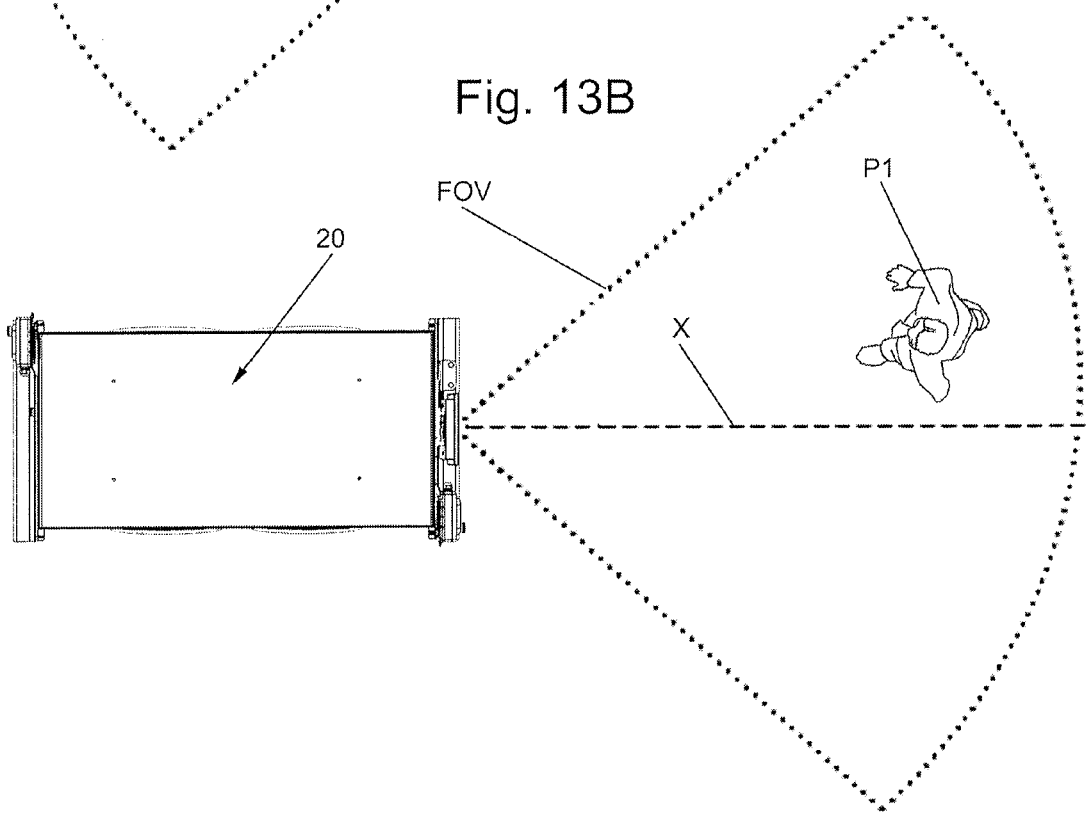
FIG. 13B is another illustration, similar to FIG. 12B, showing the operation of the exemplary embodiment of the autonomous ground vehicle of FIG. 1 during the precede person route mode of operation.

As shown in FIGS. 13A and 13B, these tracking and follow/precede command iterations permit the path of the follow/precede person to control the path of the robot. As in FIG. 13A if the person following mode is enabled and if a candidate within the field of view of the front camera group is selected by the obstacle detecting and tracking module 108 as the person to be followed, e.g., P1, and P1 walks away from the front end 34 of the robot 20, the robot will automatically begin to follow P1. In particular, the base control module 124 generates velocity commands which causes the robot to move at a velocity matching the velocity of the person it is following, e.g., P1. Moreover, if the person P1 moves away from the centerline of the field of view (FOV), i.e., axis X, the robot 20 will automatically turn toward the position of P1 as reported by the obstacle detection and tracking module, thereby attempting to keep P1 at the centerline X. In the exemplary embodiment the robot 20 maintains a predetermined following distance, as established by a user of the system and based on the application to which the robot will be put, according to the tracked velocity of P1. The robot will maintain a preset minimum following distance measured from a fixed point of the robot, such as its physical center, to P1. This distance will increase as P1 speeds up, decrease as P1 slows down, and the robot will slow to a stop if P1 stops. It will be understood that minimum following distance and speed increase and decrease increments may be configured as appropriate for the intended use of the robot.

Since following occurs based on output from the obstacle detection and tracking module, the robot 20 can accommodate momentarily losing sight of P1. For a brief period, the robot will continue following P1 according to the estimated position outside the field of view. If P1 is dropped by the obstacle detection and tracking module 108 at the end of this period because P1 has not re-entered the field of view of the particular camera group and maintained in the tracker of that module, the robot will stop. Conversely, if P1 reappears in the field of view within the set period of time, and the tracker determines P1 to be the same person as previously followed, then the robot will continue following P1. As with any variable parameters of the RAS, the period during which the robot will continue its path after losing view of a tracked person may be configured as desired based upon the particular application to which the robot will be put.

In the precede person mode, the robot responds in an analogous manner to that described above with respect to the follow person mode. Thus, as shown in FIG. 13B the field of view FOV is established with respect to the rear camera group 48. The user P1 to be preceded guides the robot 20 by walking toward the rear end 36 robot. Once P1 has come within a preset minimum distance from the robot the base control module 124 generates velocity commands causing the robot to move away from P1 to maintain the established minimum distance and maintain the user at the centerline X of the field of view FOV. The user, e.g., P1, can steer the robot by moving off the centerline X. Similar to the person following behavior, if the user, e.g., P1, moves away from the centerline, the robot rotates toward P1's position, as reported by the obstacle tracker, in order to keep P1 centered in the field of view. If P1 walks outside the field of view FOV and is not reacquired by the tracker within a preset period of time, the robot stops moving.

Figure 15:
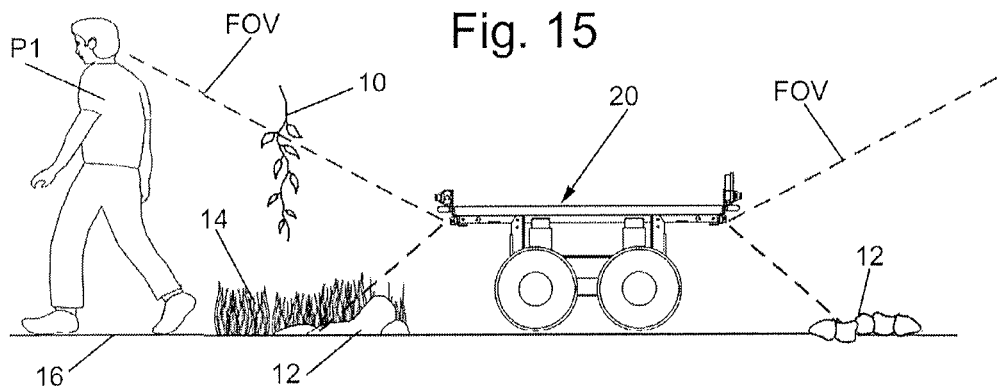
FIG. 15 is an illustration showing the obstacle and terrain detection operation of the exemplary embodiment of the autonomous ground vehicle of FIG. 1 in an outside environment, e.g., in an agricultural field.
Figure 16:
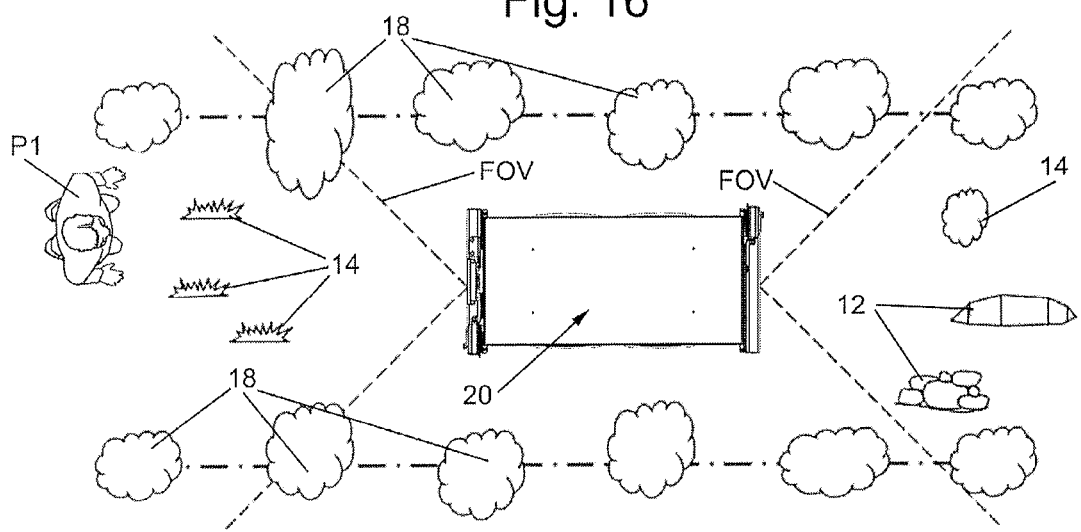
FIG. 16 is an illustration showing the crop row detection, tracking and autonomous row traversal operation of the exemplary embodiment of the autonomous ground vehicle of FIG. 1 in an outside environment, e.g., in an agricultural field.

In FIGS. 15 and 16 the robot 20 is shown to illustrate its obstacle and terrain detection features in an outside environment, e.g., in an agricultural field. In FIG. 15 the robot is shown in its follow person mode wherein the person P1 being followed is shown within the front field of view of the front camera group. That person is detected by the obstacle detecting and tracking module 108. Any obstacle, such as an overhanging tree branch 10, rocks 12 and vegetation 14 in the front field of view are also detected by the obstacle detecting and tracking module 108. Any obstacle, such as rocks 16, in the rear field of view are also detected by the obstacle detecting and tracking module. In FIG. 16 the robot is shown traversing a path between two rows of crops 18. In that figure front camera group is shown acquiring images of various objects within the front field of view, namely, a person P1, adjacent portions of the rows of crops 19 and vegetation on the terrain so that such objects are detected by the obstacle detecting and tracking module. The rear camera group is shown acquiring images of objects, e.g., other portions of the rows of crops 18, vegetation, 14 and rocks 12, within the rear field of view so that those object are detected by the obstacle detecting and tracking module.

As should be appreciated by those skilled in the art any of the objects in either of the fields of view of FIGS. 15 and 16 represents a potential obstacle to the robot's movement. To ensure that any potential obstacle is handled appropriately, the path and motion planning module 120 includes an obstacle handler submodule configured for detecting potential obstacles in the path being taken by the robot, for classifying those detected obstacles as being either traversable, avoidable, or non-traversable, and for causing the robot to move along its chosen path without change if a detected obstacle is traversable. If the detected obstacle is deemed to be avoidable the obstacle handler will cause the robot to deviate in its movement along the follow person route or the precede person route, to avoid that detected obstacle. If however, the detected obstacle is deemed to be non-traversable the obstacle handler will cause the robot to slow down or stop in its movement along the path.

By executing its follow person or precede person mode of operation, the robot is able to learn a route for subsequent autonomous execution. Learning a new route and later autonomous execution of that route may, in general, be effected using a similar approach to the visual teach and repeat method of Furgale, see Table A #12, or other known methods. Specifically, with respect to the collaborative autonomous ground vehicle of the present invention, in the teach and repeat pipeline, during the teaching phase, data corresponding to the follow or precede path is stored for the robot as a learned route for the robot to follow during subsequent repeat sessions. During this teach phase a map is automatically generated by the RAS which will later be used for robot localization. The mapping software module of the RAS responds to the incoming filtered odometry, to append to the incoming filtered odometry data a graph-like structure with nodes by using visual key frames in conjunction with new filtered odometry measurements that are sufficiently different from already existing nodes in the graph. See e.g., Table A #14.

Figure 14:
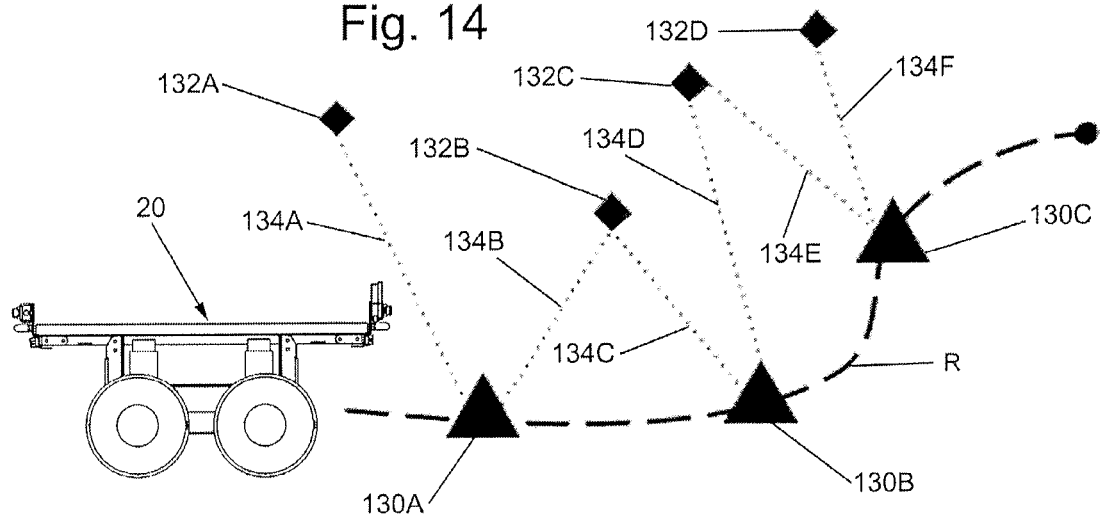
FIG. 14 is an illustration representative of the data of an exemplary topological map created by the operation of and with reference to the exemplary embodiment of the autonomous ground vehicle of FIG. 1.

FIG. 14 shows a visualization of environmental features, observations, and robot odometry information comprising the aforementioned graph data structure. As the robot 20 traverses a path or route R through its environment the robot encounters landmarks, e.g. 130A-130C within the field of view of the camera groups or discernible by other sensors of the robot. A landmark in this context is a physical feature in the environment that is measured by the sensors and can be represented mathematically in such a way that subsequent observations of that landmark can be determined to be the same landmark. The modules of the sensory and perception subsystems identify and store information relating to each landmark as a graph node 132A-132N. Each node contains information pertaining to the pose of the robot (position and orientation of the robot in the local odometry frame), a timestamp, and visual signatures. An exemplary visual signature of a node is a pair of stereo images of the encountered landmark, generated at the same timestamp as that of the node. The set of nodes is recorded by a path planning manager, which is a part of the task planner module 122 of the mobility subsystem 90. In the exemplary illustration of FIG. 14, three nodes are shown, i.e., nodes 130A-130C. Four landmarks 132A-132D are shown. Five observations 134A-134F are shown. Each of the observations constitutes a set of sensor measurements at a time instant and a mathematical relationship between two or more of those measurements, or between those measurements and previously acquired measurements. Thus, in the exemplary case, an observation is a set of input data, such as images, local/global odometry data, etc., received at a given time, marked with a timestamp. Each time the module receives a new observation, it assesses whether this observation constitutes a keyframe. Designation as a keyframe implies a significant or non-trivial observation. The first observation the module receives automatically becomes a keyframe which then is identified by the system as a node 130 in the graph representing the robot's environment, containing data, such as the types of data mentioned with respect to this example. Subsequently, each time the module receives a new observation, it compares the observation with previous keyframes to decide whether the newly acquired keyframe meets a threshold of importance to be included in the graph. This is done via comparing the location of the observation with the location of the nodes contained by the graph. If it is different enough, with respect to the programmed threshold, in terms of either position or orientation, this observation is deemed a key frame and it is recorded in the graph as a new node.

In an exemplary agricultural use illustrating the foregoing, the robot generates a crop-level mapping using row detections (as elsewhere described herein) to generate observations and mathematical constraints such that colinearity between subsequent observations of the same row is enforced. The result is a crop map with a higher metric accuracy than that which would be obtained using only local filtered odometry.

The local odometry of the robot, estimated in the local filtered odometry module 116 of the navigation subsystem 92, is fed into the visual mapping and localization module 112. This module creates a node in the pose graph and adds the newly created node to a visual teach/repeat database. Such database may be a hashmap data structure wherein a unique node identifier is the key and the timestamp is the corresponding hashed value. The node is also appended in the pose graph of its respective frame. Each node in the graph contains visual signature odometry information. Each edge connecting any two or more landmark nodes and robot pose nodes provides the relative transform from a frame relative to the robot to a world frame. This provides data representative of the location of the observation made in the environment and with respect to the robot. In subsequent autonomous execution of a learned route, a path follower submodule of the path and motion planning module 120 generates a sequence of velocity commands moving the robot 20 through the set of nodes recorded during the learning stage.

To account for potential differences arising between the node data and filtered odometry measurements collected during the autonomous repetition of a learned route a separate pose graph is created in the global odometry frame which adds the corresponding GPS positions to its own pose graph. This is executed by the global filtered odometry software module 118. One method of implementation of this global-reference pose graph is by use of the known Unscented Kalman Filter (UKF) methodology, which filters wheel encoder 78-84 and IMU 98 data from the sensing subsystem, and a smoothing and mapping submodule which performs a graph based optimization over local and global odometry frames, which may utilize known methods such as GTSAM. See Table A #13. The optimized path is then sent to the path and motion planning module 120 of the mobility subsystem 90 which, by operation of its path following submodule, in conjunction with the base controller 124 generates controller level commands for execution. During execution of a learned route if the RAS fails to localize the robot in the local odometry frame with just the visual teach and repeat, it can still continue to perform dead reckoning in the global frame pose graph and search for the corresponding nearest neighbor in an attempt to try and localize the robot and identify its position with respect to the environment. Once localized in the global frame pose graph, it can look up the corresponding node in the visual odometry pose graph of the local odometry frame, and resume its localization on this graph as well.

Figure 17:
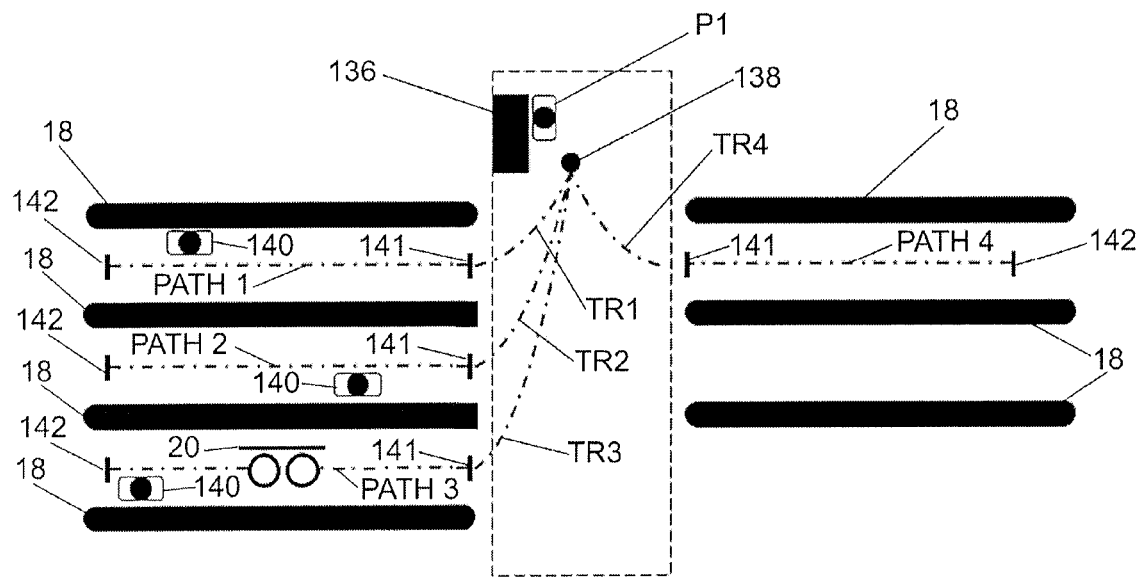
FIG. 17 is an illustration showing the exemplary embodiment of the autonomous ground vehicle of FIG. 1 during both its teach and repeat mode and its autonomous row following mode of operation in an outside environment, e.g., an agricultural field having rows of a crop or crops.

Turning now to FIG. 17, one example is shown of the operation of the robot 20 operating in its repeat mode, to traverse a taught route, learned by it during its teach mode or programmatically entered or transmitted to the robot, and to autonomously travel a path in order to collaboratively operate with a human. In the example shown in FIG. 17, the environment is a "pick and pack" environment, such as may be found in an agricultural setting or a warehouse. There, the robot traverses one or more taught routes. In this exemplary embodiment there are four taught routes TR1-TR4, but there could be any number of taught routes depending upon the particular application to which the robot is to be put. In the scenario exemplified in FIG. 17 the robot can be considered to be operating as a virtual conveyor belt in a "shuttle mode" with guided exploration. In this regard, each of the taught routes TR1-TR4 extends between a common starting point 138, closely adjacent a packing area 136, and a path. Depending upon the application to which the robot will be put such paths PATH1-PATH 4 may, for example, represent the traversable ground area between rows of various types of objects or structures, like the agricultural crops 18 (e.g., plants, trees, vines, etc.) or warehouse shelves or other indoor work areas or stations. The first end 141 of a path lies at a position in between the rows, permitting guided operation to be discontinued at this point in favor of the autonomous row following operations of the robot, described more fully herein.

Operation of the robot in the shuttle mode for a pick and pack agricultural application is as follows. The user of the robot initiates the teach mode by pressing the appropriate portion of the touch screen 50 to ready the robot to learn a new taught route in either the follow person mode or the precede person mode. If, for example, the user decides that the robot is to learn the new route in the follow person mode, the user will provide the appropriate input to the touch screen to instruct the robot that it will be in the follow person mode. At that time the user can walk in front of the front end of the robot and within the field of view of the front camera group (preferably on or close to the centerline X), whereupon the robot will begin to follow the user. If the user decides that the robot is to learn the new route in the precede person mode, the user will apply the appropriate input to the touch screen. Then the user can move to a position behind the rear end of the robot within the field of view of the rear camera group (preferably on or close to the centerline X) and start walking towards the robot, whereupon the robot will begin to move away from the user and will precede the user as the user traverses the desired route. By walking in front of the robot in its follow mode or walking behind the robot in its precede mode, the user will establish the route that the robot is to learn and the robot will learn that route and store it in its memory as a taught route.

In the exemplary agricultural scenario of FIG. 17, the user initiates this taught route at the packing area 136 or other labor area. In this example, each taught route TR1-TR4 extends from a route start point 138 located closely adjacent the packing area 136 to a first end 141 of one of the paths PATH1-PATH4, each path being essentially the traversable ground space between rows of crops 18. Thus, the user has completed a lead/follow interaction with the robot through the taught route, e.g., TR1, and the user can end the teach mode by providing an appropriate input to the user interface, causing the RAS to store the newly taught route. The robot is now ready to autonomously follow the taught route if and when instructed to do so. When that action is desired, all that is necessary is for a user to provide an appropriate input command to the user interface to cause the robot to go into its repeat mode of operation and identifying the particular learned route for route recall. In the exemplary scenario shown, the user would, at this point, operate the forward button of the user direct interface to cause the robot to move forward and initiate its next phase of operation.

In the scenario shown, the next phase of operation engages the autonomous row detection capabilities of the robot. The taught route extends to a point in the space between two rows which point is the first end 141 of a path, e.g. PATH1. In forward travel mode, the robot will autonomously follow the path, as further described elsewhere in this disclosure, to its end point 142.

In the exemplary scenario shown, a human crop picker 140 is located adjacent the rows of crops along each of the paths. The picker may approach the robot and operate the user direct interface to stop the robot at any time so that the picker can load the crops that he/she picked onto the robot's modular payload bed 22. The RAS may also be configured to detect and classify a picker 140 and automatically stop at the location of the picker in order to receive its payload and await further command by operation of the user direct interface. In yet another optional mode of operation, such wait step could be timed and the robot could resume its path traversal upon expiration of the pre-determined waiting period. An alternative means for collection may include configurations of the robot, wherein the robot itself does the picking of the crops (or in the case of a warehouse application picks the items from shelves to which the robot moves). In any case, the operation of the modules and submodules of the navigation subsystem of the robot will cause the robot to execute its autonomous path traversal functionality to traverse the path PATH1 from the first end 141 to an end point 142, e.g., the length of a row of crops adjacent that path PATH1.

Throughout this autonomous path traversal, the robot RAS will cause it to execute row edge detection (to be described later) and related perception, navigation, and mobility capabilities to maintain its autonomous course and avoid damage to the crops, the robot itself, or injury to humans. Upon reaching an end point 142, e.g., a second end of a row of crops on adjacent that path, the robot will have completed its autonomous path traversal operation of path PATH1 and will by operation of its navigation subsystem identify that it has arrived at the end point 142 of that path. The robot will then autonomously execute traversal of the path PATH1 back to its start point 141 and the taught route TR1, each in reverse in order to return to the start point 138 adjacent the packing area 136 to deliver its crop payload. Once the robot has returned to the start point, a user at the packing area 136 may instruct the robot to autonomously follow another of the taught routes, e.g., TR2-TR4, that already exists in the taught route database of the RAS to collect crops from the path, e.g. PATH2-PATH4, led to by that taught route. This action can be repeated for each row of crops. Moreover, the user may instruct the robot to go back to the last path it traversed, i.e., path PATH1, via the appropriate taught route, i.e. TR1, by entering the appropriate user interface command. Further still, the user may also choose to teach the robot a new route to follow, in which case the robot will be instructed to operate in its teach mode, whereupon it will either follow or precede the user in the new route to be learned. Such process is best illustrated and more fully described with reference to FIG. 21.

Figure 18:
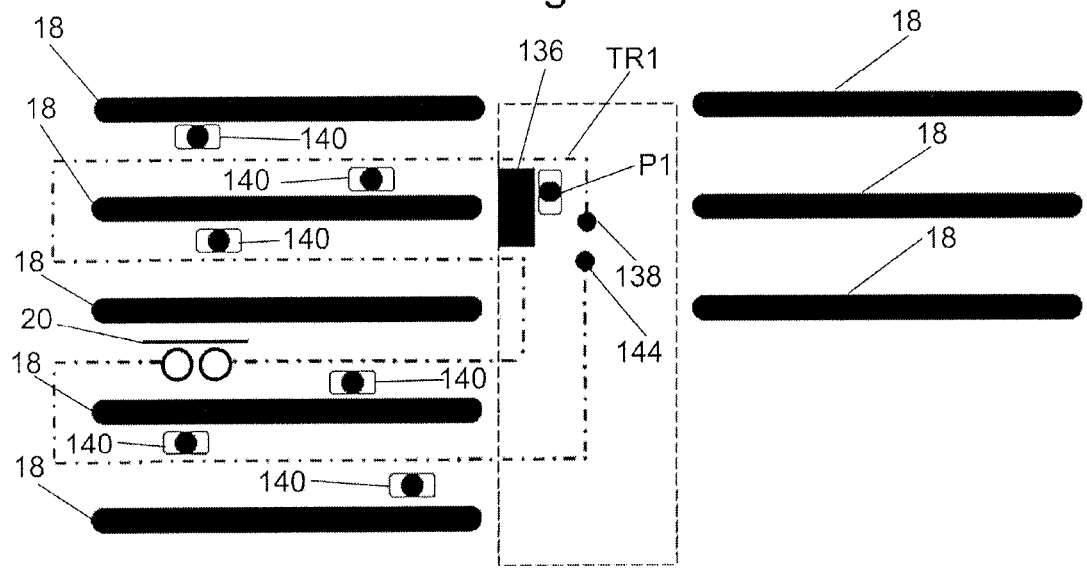
FIG. 18 is an illustration showing the exemplary embodiment of the autonomous ground vehicle of FIG. 1 during what can be called a "virtual conveyor belt loop mode" of operation in an outside environment, e.g., an agricultural field having rows of a crop or crops.

Turning now to FIG. 18, the robot 20 is shown operating in an agricultural environment like that of FIG. 17 so that it also acts as a virtual conveyor belt, but in what can be called a loop mode of operation. To that end, the taught route TR1 is a continuous path extending along each of the rows 18 from the start point 136 closely adjacent the packing area, to an end point 144. The end point 144 is located closely adjacent the start point so that the path is essentially a loop, whereupon the crops collected by the robot can be readily unloaded at the packing area. During the loop mode of operation depicted in FIG. 18 the robot 20 will stop at each of the human pickers 140 so that each can place his/her collected crop on the robot's payload bed, whereupon the robot will then autonomously move to the next picker and after the last picker's crop has been loaded onto the payload bed, the robot will move back to the end point, whereupon the crops will be unloaded.

Figure 19:
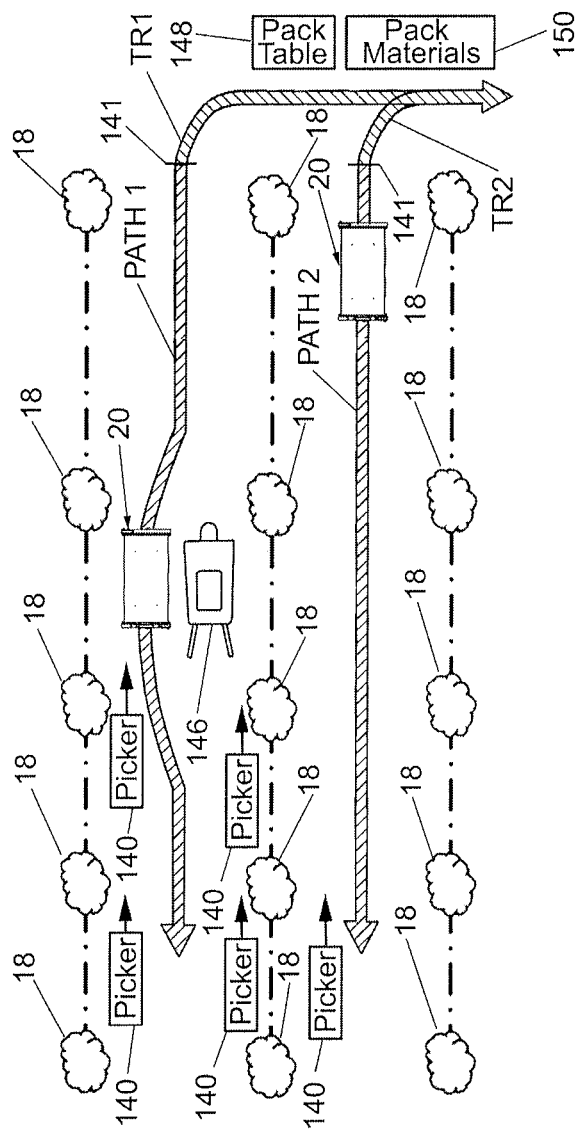
FIG. 19 is an illustration showing the exemplary embodiment of the autonomous ground vehicle of FIG. 1 during what can be called an "obstacle detection and handling mode" of operation in an outside environment, e.g., an agricultural field having rows of a crop or crops.

Turning to FIG. 19, the processes and capabilities described with respect to FIG. 18 are illustrated in the specific environment of an agricultural field. In this example, a robot 20 is shown engaged in autonomous traversal of traversable ground space between crop rows 18. The path of autonomous travel of the robot is indicated by the cross-hatched paths TR1 and TR2, which merge together adjacent an exemplary pack table 148 and a pack materials station 150. From there the paths LR1 and LR2 extend to respective end points 142 located at the end of the crop rows 10. As can be seen in FIG. 19 the portion of the paths where they merge is shown by cross-hatching extending in one direction, whereas the portions of the paths where they diverge from their merger point is shown by cross hatching in the opposite direction. The portions of the paths which diverge extend from their merger point down the respective rows of the crops to end points 142 of the paths. The robot 20 will maintain its path of autonomous travel near to the centerline of the traversable ground space between the rows of crops under the control of the robot's row detection and tracking module 110 and other modules of the RAS. To that end, the robot is configured for centerline detection. The function of centerline detection and tracking is achieved by processing the sensory input to the perception subsystem at a predefined frequency, thereby obtaining up-to-date point cloud data generated from the stereo cameras of the camera group having a field of view toward the robot's intended direction of travel. At each iteration the point cloud is segmented into two pre-defined boxes symmetric about the robot frame's xz-axis, wherein the x-axis points in the forward direction (with respect to current operation) and the z-axis points in the upward direction, and the origin of the robot frame is located at the geometric center of the autonomous ground vehicle. In the exemplary system these boxes are designed to exclude all points below a set height threshold, thereby excluding objects on the ground, which may be obstacles, such as fruit bins or wheelbarrows. Similarly, the boxes are configured to have a limited height to ignore noise from the sky or upper limits of the crop row canopy. The boxes are also designed to exclude all points which are laterally too far away from the centerline of the robot based upon either a configured distance or the field of view of the sensor. Lastly, the boxes are designed to ignore all points which are so far from the camera such that the depth measurement becomes unreliable due to the constraints of the sensory input device or processing capabilities.

As elsewhere disclosed herein, depth image information for each image may be converted into a set of points in the three dimensional space of the camera frame. Using standard frame transformations, these sets of points are transformed into the robot frame, permitting the robot to evaluate its position with respect to the identified crop row edges. The row detection and tracking module fits a set of parallel lines to the sets of points, stipulating that one line must be fitted to the points in one box and the other line must be fit to the points in the other box, each box representative of a mono component of the stereo image. Various methods may be employed for such detection. In particular, a random sample consensus (RANSAC) algorithm may be utilized to find the best fit model for each edge detection, this method being understood as an efficient example of such suitable algorithm for estimation utilizing the minimum observation set size for object identification.

The RANSAC, or other parameter estimation model runs for a preset number of iterations. At each iteration two points are randomly selected from each of the two point cloud boxes. A simple linear regression is used to fit a set of parallel lines to these two pairs of points. Lastly, a number of model inliers are determined by calculating how many points are within a predefined threshold of the appropriate line. After all iterations are completed, the inliers from the iteration which produced the most inliers are again fit with a set of parallel lines, and those final model parameters can be reported as a row detection.

In order to minimize erroneous row detections, prior to actually reporting the row detection to the tracker or odometry filter, detections are checked to ensure they meet a set of programmatic criteria. By way of specific example, if a detection produces rows which are too close together, too far apart, or not straddling the robot, they may be rejected and not reported. All acceptable detections are then passed to a tracker.

Having received the acceptable row detection information, the local odometry filter operates to accept or reject the tracked detection as a properly identified row. Two exemplary methods for such confirmation are as follows. In a first exemplary operating mode, the position and orientation of each side of the crop row is tracked using a Kalman Filter. The state tracked by the filter is the mean position of the row and the heading of the row in the ground plane with respect to the robot. The Kalman filters serve to smooth the noisy detections made using RANSAC and provide a reliable estimate of the state of the crop row. In addition to the detection-level set of rejections, the filter uses a simple Mahalanobis distance threshold limit to reject observations of point clouds or point cloud portions that are unreasonably far from the current state and confidence parameters of the filter. Such Mahalanobis distance method will be known to one of skill in the art as an exemplary useful method for identification of observations in a multi-variant context. In a second exemplary operating mode for detection confirmation, a window filter is used to track the crop row. All detections of the row center within a set distance—that is, the window—are recorded and stored by the filter. Each time a new detection is received from the corresponding camera or other sensory input, if the detection is either far enough from the previous detection or the most recent detection in the filter is old enough, the filter considers the new detection. Each of these "update distance" and "update timeout" parameters may be predefined and/or configurable parameters. Upon consideration of this information with reference to the parameter set, if the filter has not grown to a sufficient size, the detection is simply accepted. If the filter is sufficiently sized, the detection is only accepted if the heading of the detection is sufficiently aligned with the filter model and the detected row center point is within a threshold distance of the filtered centerline. The necessary alignment, maximum acceptable distance, and minimum sufficient filter size also may be predefined and/or configurable parameters.

Until the filter size has reached its minimum parameter, the row track is determined by taking the mean of all measurements in the filter. The mean value of all heading measurements determines the heading, and the mean value of all row center detections determines the row center offset from the robot. Once the filter size has reached its minimum parameter, a best-fit line of all row center detections in the filter is calculated. The slope of the best-fit line is used to determine the row heading, and the distance of the line from the robot is used to determine the offset of the row from the robot. Based upon these determinations, the robot may continue its traversal of the path, attempting to maintain a route closest to the centerline of the space between rows.

Further contributing to the accuracy of this centerline travel and the robot's ability to reverse direction if necessary, the row detection filters may be constantly running for both front and rear sets of stereo image inputs or other sensors. In other words, there may be, simultaneously, a front row detection, rear row detection, front row track, and rear row track, at all times while the robot is following a row. A row governor uses the position of the robot and its commanded direction to determine which track to use for row following. The exemplary governor has one of three states: inactive, forward, and reverse. When inactive, all row tracks are ignored and no commands are sent. When in forward, the front row track is used to send commands to the robot controller based on the robot's position and heading with respect to the front row track. Similarly, in reverse, the rear row track is used to send commands to the robot controller based on the robot's position and heading with respect to the rear row track. To facilitate smooth integration into the picking process, the row governor also keeps track of the robot's accumulated distance as the robot goes up and down a row. If the robot is going forward and a maximum forward distance has been set, the robot can automatically stop or reverse direction at the maximum distance. Similarly, if the robot is going backward and a maximum reverse distance has been set, the robot can automatically stop or reverse direction there. As with prior features, the parameters of these functions may be predefined and/or configurable based on the operating mode and intended use of the robot.

Component to the above-described implementation of centerline travel, it is necessary for the systems of the robot 20 to detect the row edges themselves. This detection may be achieved using the methodology of the point cloud based approach described above. It is also contemplated that the robot may achieve edge detection using an image segmentation based approach. Similarly to the point-cloud based approach, crop row position and orientation is determined from data obtained by the stereo camera pair of the camera group having its field of view in the robot's direction of travel. In the image segmentation implementation, rather than using the point clouds calculated using both images from the pair, only one image need be used as input to a semantic segmentation model. Those of skill in the art may implement such semantic segmentation model in other ways, but will know that models such as Deeplab and Mobilenet may be employed. See Table A #2, #3. The image semantic segmentation model predicts the class of each pixel in the image. In an exemplary agricultural environment such as that of FIG. 19, the classes may consist of traversable ground, row edge area, and background. This model is trained with appropriate labeled image data. Greater expertise of the classifier may be achieved by specialized training, such as through the use of image data of crop rows containing diverse conditions; for instance weedy/clean, variable lighting conditions, etc. Such variable environmental conditions which may be inherent or likely to present themselves in other environments may be used to train the system for use in such environments.

The output of the semantic segmentation model of the exemplary embodiment is represented by an image mask filled with predicted class identifiers. For example, the identifiers of the illustrated exemplary environment may be selected from the set {0,1,2} where the elements of the set denote background, traversable ground, and row edge area, respectively. The system infers row edges from the classified row area. The exemplary system clusters the mask of the row edge area into left and right areas, such as by using the 8-connectivity or other pixel connectivity level provide sufficiently accurate clustering of the mask. See e.g. Table A #4. The system computes the middle point of each row of the left and right row edge areas such that the line functions of the left and right row edges can then be inferred by fitting a line to the middle points in each row edge area by linear regression. These lines are then projected to the ground plane using the known frames transforms of the system and homographic projection. Once projected, the detections can be tracked as described above, using either a Kalman filter approach or a window-filter approach, thereby providing data representative of the row edges, suitable for use in conjunction with the other perception, navigation, and mobility operations.

Referring further to FIG. 19, the robot 20 maintains its path of autonomous travel by execution of the perception, navigation, and mobility capabilities described above, utilizing the available information regarding row edge location and centerline location. Upon identification of obstacles, such as a wheelbarrow 146 or a picker 140, the robot will, by these methods, determine whether it must deviate from its path along the centerline, change its speed, or stop. In the exemplary FIG. 19, the robot 20 taking path LR1 is shown deviating from a linear path to avoid a wheelbarrow located in the path.

During its autonomous traversal of the path between rows, for any obstacles detected including persons, two sensory corridors of interest are defined. These corridors are monitored by the obstacle handler submodule of the path and motion planning module, based on obstacles reported by the obstacle detection and tracking module. If obstacles, including pickers, are present in one of the two corridors, the robot slows down or stops, accordingly, or may deviate from its centerline path if it determines that it may safely travel around the obstacle, evaluating the same by similar navigation criteria, such as whether it may do so without contacting the row edge. The determination by the present system to slow down, stop, or deviate improves upon prior systems by its utilization of the described image segmentation and object classification capabilities, which act as key safety features for the robot's obstacle handling.

In this regard, the operational flow of obstacle handling begins with collecting and parsing raw feed data from the cameras, optional LIDAR units, or other employed sensors. This feed is relayed into the machine learning and point cloud processing and segmentation software modules, which operate as previously described. These modules, as applied to the exemplary environment of FIG. 19, provide masks for traversable ground, vegetation rows on either side of the traveled path, and background. The mask for traversable ground is then applied to the depth image feed such that the point cloud processing and segmentation module is able to exclude depth image pixels coinciding with the traversable ground and generate a 3D point cloud representation of the robot's surroundings in a more effective manner. This point cloud is then segmented into groups of points via a data clustering method. The data clustering method may be unique to the intended use or may employ known methodologies, such as DB SCAN, see Table A #10.

Output of the point cloud processing and segmentation software modules is a ROS message composed of an array of point cloud clusters where every element in the array has a group of 3D points representing an obstacle. These array elements representing the obstacles are then available to the path and motion planning module of the system, which may consider them in order to plan and execute navigational commands. The obstacles are also relayed to the obstacle detection and tracking module which may store them as tracked elements of the given environment. Whether or not the obstacle detection and tracking module adds these elements to its database of tracked objects, data representing the obstacles may be accumulated through iterations of the detection process for utilization via short term memory. These processes result in output in the form of a list of point cloud obstacle representations. By processing of these point cloud obstacle data received from the obstacle detection and tracking module an obstacle handler submodule of the path and motion planning module determines if the robot should deviate, slow down or stop, as described above.

These obstacle detection and handling functions further enable the robot to account for blind spots—areas of the environment outside the current field of detection of the robot's sensors at a given moment—since the classified obstacles are all tracked via a series of Linear Kalman Filters, where the time parameter for determining to drop the tracking of a stationary obstacle may be configured to be significantly longer than the same time parameter for non-stationary objects. In addition, point cloud obstacles from multiple iterations are accumulated, creating a short term point cloud obstacle memory, as described above with respect to the general process of obstacle detection and handling.

In the exemplary embodiment the obstacle handling submodule of the path and motion planning module classifies the observed obstacles into three, possibly overlapping, groups. Each object class reported by the obstacle handling submodule will be identified as belonging to one or more of these groups. The first of these groups is referred to as "traversable", where the robot operation does not require any interruption as the obstacle does not pose any safety hazards to the robot or the object. The second group is referred to as "avoidable". The robot is able to generate local virtual force fields, see e.g. Table A #5, to move around these obstacles while executing its main task, such as row following or path following. A force field in such context will be understood to comprise a vector field whereby the vectors are directed outward, for example radially, from a particular point, e.g an obstacle, and may have a unit length or a length with an inverse relationship to the distance from the particular point. See Id. When used as control input, vectors sampled from such a field serve to steer the robot away from the obstacle, doing so with greater force if the obstacle is closer. The last group of obstacles are referred to as "non-traversable", where the RAS determines that safe traversal is not possible and the robot is expected to slow down and eventually stop if any of these obstacles occupies its slowdown or stop corridors. Such operation is best shown with reference to FIG. 19.

As mentioned earlier FIG. 20 is a flow diagram of the operation of the robot 20 to achieve vision-based learning. In particular the robot is configured to achieve lifelong vision-based learning of object classes. To that end, the robot detects an object 160 by the methods previously described operating in conjunction with the robot's cameras and/or sensors, also previously described. Such detection in this example includes capturing images of the detected object and attempting to classify the detected object for operational decision-making purposes. If the object is recognized 162 by the perception system, the RAS communicates data indicative of this successful identification and the category of the identified object to the appropriate module processes 164 which may act upon this information, such as by executing the obstacle handling procedures more fully described in other sections of this disclosure. If at step 162 the object is not recognized the RAS records images of the object 166 as or as a component of an observation and transmits these images to a cloud-based or other remote system 168 which performs the assessment of the object's category 170 as more fully described herein. Because the object has not been recognized to this point, the object is entered into and expands the neural network 172 which has now "learned" a new object for subsequent identification in the operation environment. To permit use of this new classification without re-identification (i.e. fully executing the foregoing steps upon the next observation) the cloud system pushes this neural network identification and categorization to all connected robots 174, which may then immediately recognize the object at step 162 of subsequent iterations.

Turning now to FIG. 21 the steps in the operation of the robot 20 in the learn new route mode of operation will now be described. The process is described with reference to the robot 20 in its follow person mode. It will be understood that such may similarly be achieved by operating the robot in its precede person mode. In particular, a user, by operation of the user interface, selects options indicating that the robot should learn a new route and do so in its follow person mode 180. Receiving such instruction, the robot 20, by operation of its previously described follow candidate processes of the perception subsystem, detects whether it observes a person and whether such person should be selected and tracked 182. If a person is not detected or is otherwise rejected as a suitable follow candidate, the RAS remains at this step 182. If a person is detected and tracked the robot follows the person by execution of the follow person methods described and builds a map of the route throughout its follow person operation 184 as also previously described. The steps 182-184 of this process continue for so long as the user does not end the learning session. Upon selection of the user by operation of the user interface to end the mapping session 186 the robot terminates execution of its follow person mode and saves data representing the new taught route and the map thereof 188.

Figure 22:
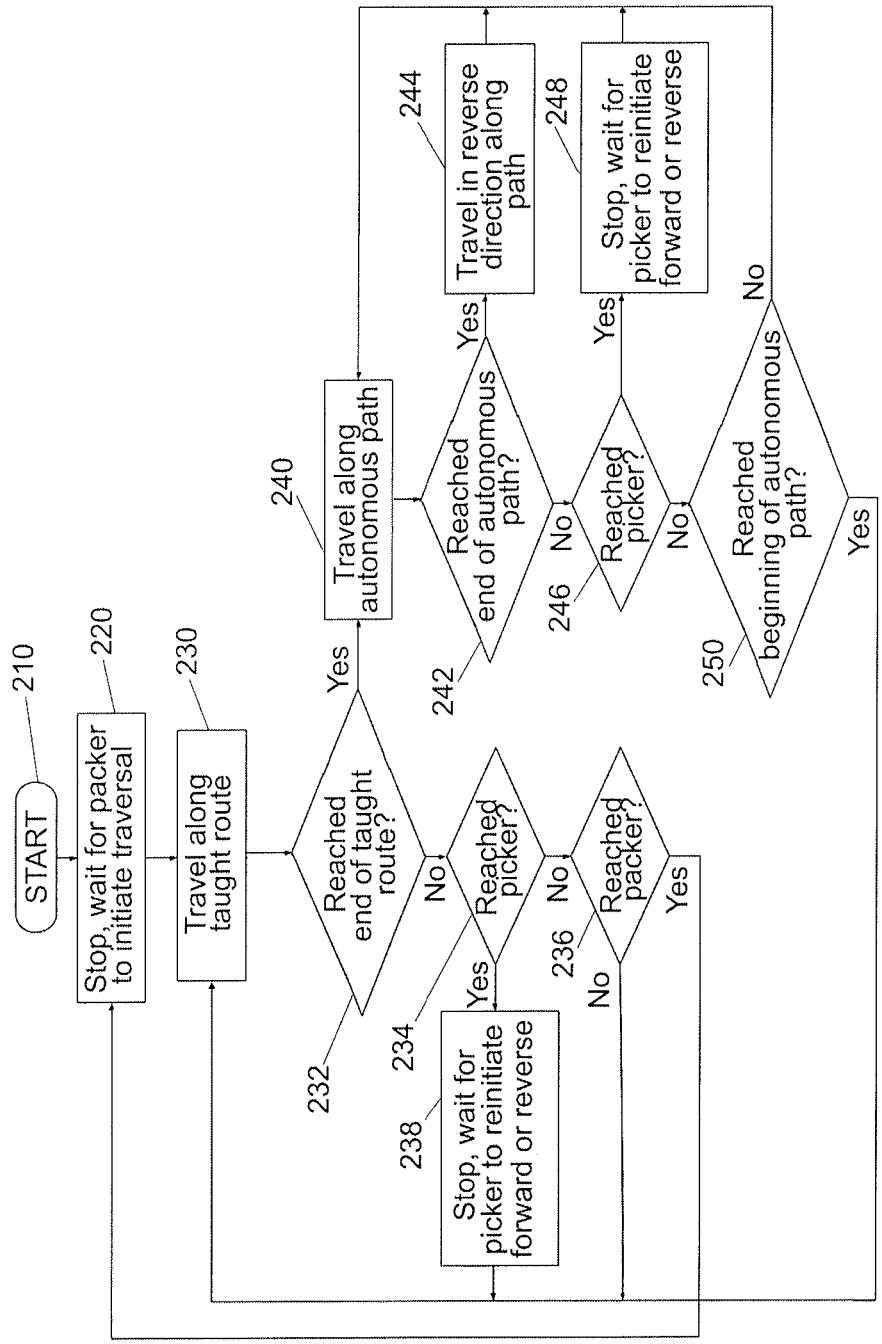
FIG. 22 is a flow diagram of the operation of the exemplary embodiment of the autonomous ground vehicle of FIG. 1 to follow a taught route and/or an autonomous path for a harvesting process in an agricultural application.

Turning now to FIG. 22, the operation of the robot 20 when following a taught route and/or an autonomous path is shown in the context of an exemplary agricultural environment. Such taught route is one previously followed by the robot or otherwise provided to the systems of the robot and for which the robot has accumulated and stored environmental and odometry data such as was described with reference to FIG. 14. An autonomous path is one traversed by the robot in accordance with its autonomous path following capabilities, further described herein. An exemplary execution of such operation for a harvesting process in an agricultural application will now be described.

To that end, a user in this example is a packer in a pick and pack environment. The robot is located and stationary near the packing area of the exemplary agricultural environment at the start 210 of its operation. The robot waits for the packer to initiate traversal 220 by operation of the user interface of the robot. The user commands the robot to travel along a previously taught route 230, which route may be one through which the user has led the robot in its teach mode or which taught route has otherwise been programmed or communicated to the robot. As described in previous examples, such taught route may be one leading from the packing area to a path between rows of crops. A user, again in this example the packer, initiates operation of the robot's systems by entering a forward direct signal by operating the user direct interface. During its travel along the taught route the robot continuously observes, by the system functions and subsystem processes described herein whether it has reached the end of the taught route 232.

If the robot has not reached the end of its taught route it additionally observes whether it has reached a picker 234 of crops. If it has reached a picker, the robot will stop and wait for the picker to reinitiate travel of the robot either in forward or reverse 238 along the taught route. This stopping step 238 permits the picker to place harvested crops on the modular payload bed of the robot. Upon receiving instruction from the picker to continue traversing the taught route the process presently shown operationally returns to step 230. If, at step 234, the robot has not reached a picker it additionally continues to observe whether it has reached a packer 236. If the robot has neither reached the end of its taught route, a picker, or a packer, this indicates that it should continue its travel along the taught route and the process presently shown operationally returns to step 230. If, at step 236, the robot has reached a packer this indicates completion by the robot of a loop operation or other operation that has caused the robot to travel to another packer and the systems of the robot operationally return it to step 220 where the robot will stop and wait for the packer to again initiate traversal.

At the previously-described step 232 in the context of traversal of a taught route, if the robot determines that it has reached the end of a taught route its mode of operation causes it to travel along the autonomous path 240 that it has reached. Similarly to its operation just described, the robot in its autonomous path following mode—such as may permit it to traverse the ground between two rows of crops—will continually observe its environment. If the robot has reached the end of the autonomous path 242 its automation systems will automatically reverse the direction of travel of the robot so that it traverses the same path in the opposite direction 244 until it returns to the start of the path, operationally returning to step 240 where it will repeat its path following operation. If the robot at each instance of step 242 has not reached the end of the path it further observes whether it has reached a picker 246. If it has reached a picker the robot will stop and wait for the picker to initiate continuation of the robot's forward or reverse traversal 248 of the path by operation of the user direct interface. This permits the picker to place harvested crops on the modular payload bed of the robot. Upon receiving instruction from the picker to continue traversing the path, the process presently shown operationally returns to step 240. If the robot at step 246 has not reached a picker, the robot continues traversal observing whether it has again reached the beginning of the autonomous path 250. If it has not, it continues the just-described traversal and observation steps, operationally returning to step 240. If, at step 250, the robot has reached the beginning of the autonomous path, this indicates that it has returned to the point at which the taught route following operation had terminated in favor of the autonomous operation. This may occur, for example, in a shuttle type of operation, as previously described. Upon returning to the beginning of the autonomous path, the robot stops and waits for the packer to initiate traversal, operationally returning to step 220.

It will be understood that each of the observational steps described with reference to this FIG. 22, namely steps 232, 234, 236, 242, 246, and 250 are accomplished by the methods elsewhere described herein, including by use of the robot's visual learning and recognition systems and identification of the locations and people appropriate to each respective step. Similarly, the traversal described with respect to this FIG. 22 utilizes the row detection and row following autonomous capabilities of the robot more fully described throughout this disclosure.

The following references are referred to herein or will be known by one of skill in the art to provide enabling detail to certain known functions and methods referred to herein:

TABLE A

| | REFERENCES |
|---|---|
| 1 | Zarchan, P. Musoff, H., & American Institute of Aeronautics and Astronautics. (2009). *Fundamentals of Kalman filtering: A practical approach*. Reston, Va: American Institute of Aeronautics and Astronautics. |
| 2 | Chen, L., Papandreou, G., Kokkinos, I., Murphy, K., & Yuille, A. L. (2018). DeepLab: Semantic Image Segmentation with Deep Convolutional Nets, Atrous Convolution, and Fully Connected CRFs. IEEE Transactions on Pattern Analysis and Machine Intelligence, 40(4), 834-848. doi:10.1109/tpami.2017.2699184 |
| 3 | Sandler, M., Howard, A., Zhu, M., Zhmoginov, A., & Chen, L. (2018). MobileNetV2: Inverted Residuals and Linear Bottlenecks. 2018 IEEE/CVF Conference on Computer Vision and Pattern Recognition. doi:10.1109/cvpr.2018.00474 |
| 4 | Cheng, C C; Peng, G J; Hwang, W L (2009), "Pixel Connectivity", IEEE Transactions on Image Processing, 18 (1): 52-62, doi:10.1109/TIP.2008.2007067, PMID 19095518, retrieved 2009 Feb. 16 |
| 5 | Ilhan, B. D., Johnson, A. M., & Koditschek, D. E. (2018). Autonomous legged hill ascent. *Journal of Field Robotics*, 35(5), 802-832. |
| 6 | Redmon, J., & Farhadi, A. (2017). YOLO9000: Better, Faster, Stronger. In Proceedings of the IEEE Conference on Computer Vision and Pattern Recognition (pp. 7263-7271). |
| 7 | Redmon, J. (2013). Darknet: Open Source Neural Networks in C. |
| 8 | Everingham, M., Eslami, S. A., Van Gool, L., Williams, C. K., Winn, J., & Zisserman, A. (2015). The Pascal Visual Object Classes Challenge: A Retrospective. International Journal of Computer Vision, 111(1), 98-136. |
| 9 | Fua, P. (1993). A parallel stereo algorithm that produces dense depth maps and preserves image features. Machine vision and applications, 6(1), 35-49. |

TABLE A-continued

REFERENCES

| 10 | Schubert, E., Sander, J., Ester, M., Kriegel, H. P., & Xu, X. (2017). DBSCAN revisited, revisited: why and how you should (still) use DBSCAN. ACM Transactions on Database Systems (TODS), 42(3), 19. |
| --- | --- |
| 11 | Konstantinova, P., Udvarev, A., & Semerdjiev, T. (2003, June). A study of a target tracking algorithm using global nearest neighbor approach. In Proceedings of the International Conference on Computer Systems and Technologies (CompSysTech'03) (pp. 290-295). |
| 12 | Furgale, P., & Barfoot, T. D. (2010). Visual teach and repeat for long-range rover autonomy. *Journal of Field Robotics*, 27(5), 534-560. |
| 13 | Dellaert, F. (2012). Factor graphs and GTSAM: A hands-on introduction. Georgia Institute of Technology. |
| 14 | Labbe, M., & Michaud, F. (2019). RTAB-Map as an open-source lidar and visual simultaneous localization and mapping library for large-scale and long-term online operation. *Journal of Field Robotics*, 36(2), 416-446. |

It must be pointed out at this juncture that the exemplary robot 20 as described above and its various methods of use, are merely exemplary of various collaborative autonomous ground vehicles that can be constructed in accordance with this invention, and which can be used in a multitude of different ways in different applications. Thus, changes can be made in the structure of the robot and in its RAS from that described above. For example, one of skill in the art should understand that the user's interaction with the systems of the autonomous ground vehicle by a specific user interface is exemplary and that many other forms of user interface may be employed within the scope of this disclosure. By way of further example, but not limitation, such interaction might also be accomplished through voice command or other auditory input, motion detection or other visual input, or any of the numerous tactile interfaces now known or that may be developed, such as push-button, touchscreen, and other capacitive inputs.

Without further elaboration the foregoing will so fully illustrate our invention that others may, by applying current or future knowledge, adopt the same for use under various conditions of service.

We claim:

1. An autonomous ground vehicle for traversing a ground surface in an environment comprising:
a body comprising a payload bed, a front end portion and a rear end portion, and at least one of a front camera group and a rear camera group, said front camera group comprising at least one camera having a front field of view in front of said front end portion, said front camera group providing a front camera image of said front field of view, said rear camera group comprising at least one camera having a rear field of view behind said rear end portion, said rear camera group providing a rear camera image of said rear field of view;
a drive assembly including plural wheels to enable said autonomous ground vehicle to move over the ground surface;
a control system configured to operate in a teach mode and a repeat mode and comprising a microprocessor configured to be instructed by a digital instruction set, said control system being coupled to said at least one of said front camera group and said rear camera group and to said drive assembly for controlling the movement of said autonomous ground vehicle over the ground surface in at least one of a follow person route and a precede person route, said follow person route being established by said autonomous ground vehicle automatically following a person walking away from said autonomous ground vehicle in said front field of view or said rear field of view, said precede person route being established by said autonomous ground vehicle automatically preceding a person walking toward said autonomous ground vehicle in said front field of view or said rear field of view, said control system being configured for identifying at least one person and the position of said at least one person relative to said front end portion or to said rear end portion, for detecting a region of said front camera image that contains at least one person or for detecting a region of said rear camera image that contains at least one person, for estimating the distance of the at least one person from the front or rear camera group providing the front or rear camera image, and wherein when said control system is in said teach mode said control system remembers said follow person route or said precede person route as a taught route, and when said control system is in said repeat mode causes said autonomous ground vehicle to autonomously traverse said taught route over the ground surface.

2. The autonomous ground vehicle of claim 1, wherein said control system is configured for identifying as a follow candidate a person within said front field of view or said rear field of view for said autonomous ground vehicle to follow in said follow person route, said control system being configured to identify said follow candidate from multiple persons who may be within said front field of view or said rear field of view, and wherein said control system is configured for identifying as a precede candidate a person within said front field of view or said rear field of view for said autonomous ground vehicle to precede in said precede person route, said control system being configured to identify said precede candidate from multiple persons who may be within said front field of view or said rear field of view.

3. The autonomous ground vehicle of claim 2, wherein said control system is configured for identifying said follow candidate or said precede candidate when said autonomous ground vehicle is stationary, wherein said follow candidate or said precede candidate is selected in accordance with the following criteria:
only persons within a predetermined radius from said front camera group within the front field of view or said rear camera group within the rear field of view are considered as candidates, others will be ignored;
a candidate will only be selected if the candidate is moving at a speed above a predetermined threshold;
if only one such candidate exists that candidate will be selected; and if multiple candidates exists, a candidate will be selected if he/she is closest to said front camera group and within a corridor having preset lateral boundaries within the front field of view or said rear camera group and within a corridor having preset lateral boundaries within the rear field of view.

4. The autonomous ground vehicle of claim 1, wherein said control system includes a user control interface, wherein said control system is configured to be placed in said teach mode in response to a teach input signal manually provided to said user control interface by a user of said autonomous ground vehicle, and wherein said control system is configured to be placed in said repeat mode in response to a route recall input signal, said route recall input signal being provided to said user control interface manually by a person or by an automated command.

5. The autonomous ground vehicle of claim 1, wherein said autonomous ground vehicle comprises said front camera group and said rear camera group, wherein said control system includes a user control interface, and wherein said autonomous ground vehicle is configured to selectively move over the ground surface in said follow person route or said precede person route in response to an input signal manually provided to said user control interface by a user of said autonomous ground vehicle.

6. The autonomous ground vehicle of claim 1, wherein said control system includes a user direct interface, and wherein said control system is configured to cause said autonomous ground vehicle to either stop moving over the ground surface, to go forward over the ground surface or go backward over the ground surface in response to a stop signal, a forward signal, and a backward signal, respectively, provided to said user direct interface by a user of said autonomous ground vehicle.

7. The autonomous ground vehicle of claim 1, wherein said control system comprises a perception subsystem for evaluating the environment in which said autonomous ground vehicle is located and for detecting an obstacle or a person in at least one of said follow person route and said precede person route, whereupon said autonomous ground vehicle automatically avoids said obstacle or person as necessary.

8. The autonomous ground vehicle of claim 1, wherein said front camera group comprises a pair of stereo cameras providing stereo images of objects and persons within said front field of view, and wherein said rear camera group comprises a pair of stereo infrared cameras providing stereo images of objects and persons within said rear field of view.

9. The autonomous ground vehicle of claim 1, wherein said control system comprises a sensing module for parsing raw sensory data provided thereto, said raw sensory data comprising at least one of said front camera image and said rear camera image.

10. The autonomous ground vehicle of claim 9, additionally comprising at least one encoder for providing raw sensory data regarding the rotation of at least one of said wheels to said sensing module.

11. The autonomous ground vehicle of claim 9, wherein said control system additionally comprises:
a perception subsystem for evaluating the environment in which said autonomous ground vehicle is located and for detecting obstacles in at least one of said follow person route and said precede person route;
a navigation subsystem for determining where said autonomous ground vehicle is located in reference to its surroundings in the environment, said navigation subsystem being configured for operating on local odometry data and global odometry data, said local odometry data being based on changes in position and orientation of said autonomous ground vehicle with respect to the environment, said global odometry data being GPS data; and
a mobility subsystem responsive to signals from said perception subsystem and said navigation subsystem for establishing how said autonomous ground vehicle is to move around the ground surface based on a user-assigned task.

12. The autonomous ground vehicle of claim 11, wherein said mobility subsystem includes an obstacle handler submodule, said obstacle handler submodule is configured for detecting potential obstacles in at least one of the follow person route and the precede person route, for classifying said detected obstacles as being either traversable, avoidable, or non-traversable, and for causing said autonomous ground vehicle to move along at least one of the follow person route or the precede person route without change if a detected obstacle is traversable, for causing said autonomous ground vehicle to deviate in its movement along at least one of the follow person route or the precede person route if the detected obstacle is avoidable to avoid that detected obstacle, and to slow down or stop in its movement along said taught route if the detected obstacle is non-traversable.

13. The autonomous ground vehicle of claim 1, wherein said environment has at least one row of items and traversable ground defining a path located adjacent the at least one row of items, wherein said taught route extends to said path, and wherein said control system is configured for causing said autonomous ground vehicle to autonomously move along said path.

14. The autonomous ground vehicle of claim 13, wherein said movement of said autonomous ground vehicle along said path terminates at an end point, whereupon said autonomous ground vehicle moves along said path from said end point to said taught route and then moves along said taught route.

15. The autonomous ground vehicle of claim 13, wherein terrain is one characteristic of the path, and wherein said control system is configured for determining the terrain of the path and to detect an obstacle or a person in at least one of said front field of view and said rear field of view and to cause said autonomous ground vehicle to negotiate the terrain along the path and avoid impacting said obstacle or person.

16. The autonomous ground vehicle of claim 13, wherein the at least one row of items includes an edge of the items and wherein said control system is configured to determine the edge of the items and to control the autonomous movement of said autonomous ground vehicle along the path.

17. The autonomous ground vehicle of claim 16, wherein said control of the autonomous movement of said autonomous ground vehicle along the path ensures that said autonomous ground vehicle avoids damaging the items.

18. The autonomous ground vehicle of claim 1, wherein said payload bed is modular and removable to enable it to be replaced with a particular configuration depending upon a desired use of the autonomous ground vehicle.

19. The autonomous ground vehicle of claim 1, wherein said control system is configured to operate in a first operational session and at least one subsequent operational session, said first operational session comprising said teach mode and said at least one subsequent operational session comprising said repeat mode.

20. The autonomous ground vehicle of claim 19, wherein said control system is further configured such that said repeat mode is capable of identifying at least one of said follow person route and said precede person route by identifying the location of said autonomous ground vehicle with respect to global odometry information.

21. The autonomous ground vehicle of claim 19, wherein said control system comprises a global positioning system.

22. The autonomous ground vehicle of claim 16, wherein said control system comprises a sensing module for parsing raw sensory data provided thereto into one of point cloud data or image segmentation data.

23. The autonomous ground vehicle of claim 22, said control system further configured to identify at least a subset of said point cloud data or image segmentation data as representative of at least one of said edge of the items or an element of said terrain.

24. The autonomous ground vehicle of claim 23, wherein said control system further comprises a machine learning module configured to perform said task of identifying said at least a subset of said point cloud data or image segmentation data as representative of at least one of said edge of the items or an element of said terrain by classifying said at least a subset of said point cloud data or image segmentation data and comparing said point cloud data or image segmentation data to data representative of known items or classes of items.

25. The autonomous ground vehicle of claim 24, wherein said machine learning module is implemented as one or more neural networks.

26. The autonomous ground vehicle of claim 24, wherein said digital instruction set comprises one or more instructions, one or more of said instructions having at least one variable parameter, and wherein said control system is configured such that a value of said one or more variable parameters of said one or more instructions is set or modified in response to the identification of at least a subset of said point cloud data or image segmentation data as representative of a known item or an unknown item.

\* \* \* \* \*